United States Patent
Bhotika et al.

(10) Patent No.: US 10,282,431 B1
(45) Date of Patent: May 7, 2019

(54) IMAGE SIMILARITY-BASED GROUP BROWSING

(71) Applicant: A9.com, Inc., Palo Alto, CA (US)

(72) Inventors: Rahul Bhotika, Redmond, WA (US); Lixin Duan, Seattle, WA (US); Oleg Rybakov, Seattle, WA (US); Jian Dong, Seattle, WA (US)

(73) Assignee: A9.COM, INC., Palo Alto, CA (US)

( * ) Notice: Subject to any disclaimer, the term of this patent is extended or adjusted under 35 U.S.C. 154(b) by 301 days.

(21) Appl. No.: 14/974,388

(22) Filed: Dec. 18, 2015

(51) Int. Cl.
*G06F 7/00* (2006.01)
*G06F 17/30* (2006.01)

(52) U.S. Cl.
CPC .... *G06F 17/30256* (2013.01); *G06F 17/3053* (2013.01); *G06F 17/30268* (2013.01); *G06F 17/30274* (2013.01); *G06F 17/30554* (2013.01); *G06F 17/30601* (2013.01)

(58) Field of Classification Search
CPC ......... G06F 17/30256; G06F 17/30268; G06F 17/30274; G06F 17/3053; G06F 17/30554; G06F 17/30601; G06Q 30/0635; G06Q 30/0625; G06Q 30/0603; G06Q 10/087
See application file for complete search history.

(56) References Cited

U.S. PATENT DOCUMENTS

| 8,949,252 B2 * | 2/2015 | Chittar | G06F 17/3025 707/749 |
| 2010/0250336 A1 * | 9/2010 | Selinger | G06Q 30/02 705/26.7 |
| 2013/0084002 A1 * | 4/2013 | Bhardwaj | G06Q 30/0643 382/165 |
| 2013/0086063 A1 * | 4/2013 | Chen | G06F 17/30595 707/736 |
| 2014/0314313 A1 * | 10/2014 | Kennedy | G06T 7/0079 382/165 |

* cited by examiner

*Primary Examiner* — Azam M Cheema
(74) *Attorney, Agent, or Firm* — Hogan Lovells US LLP

(57) ABSTRACT

Various approaches discussed herein enable browsing groups of visually similar items to an item of interest, wherein the item of interest may be identified in a query image, for example. One ore more visual attributes associated with the item of interest are identified, and the visually similar items matching at least one of the visual attributes are grouped together, wherein the group is ranked according to the visually similar items' overall visual similarity to the item of interest, for example by using a visual similarity score and/or metric.

20 Claims, 15 Drawing Sheets

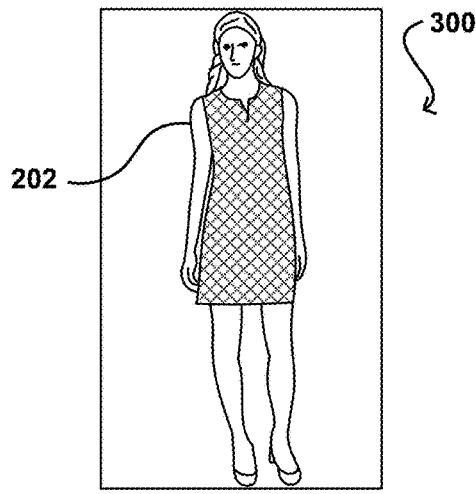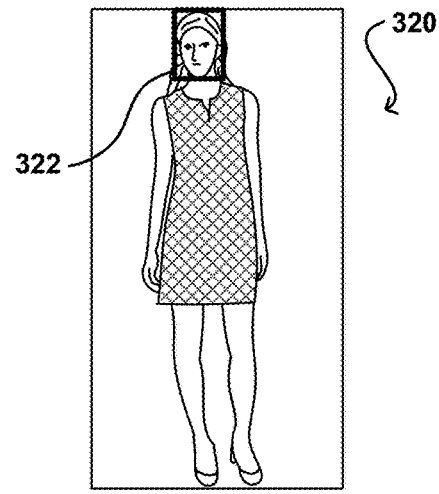
FIG. 3A  FIG. 3B
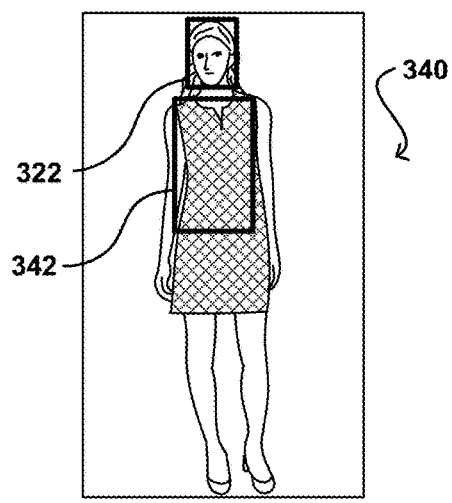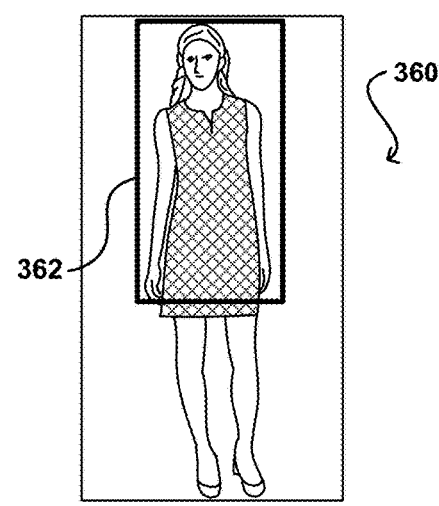
FIG. 3C  FIG. 3D

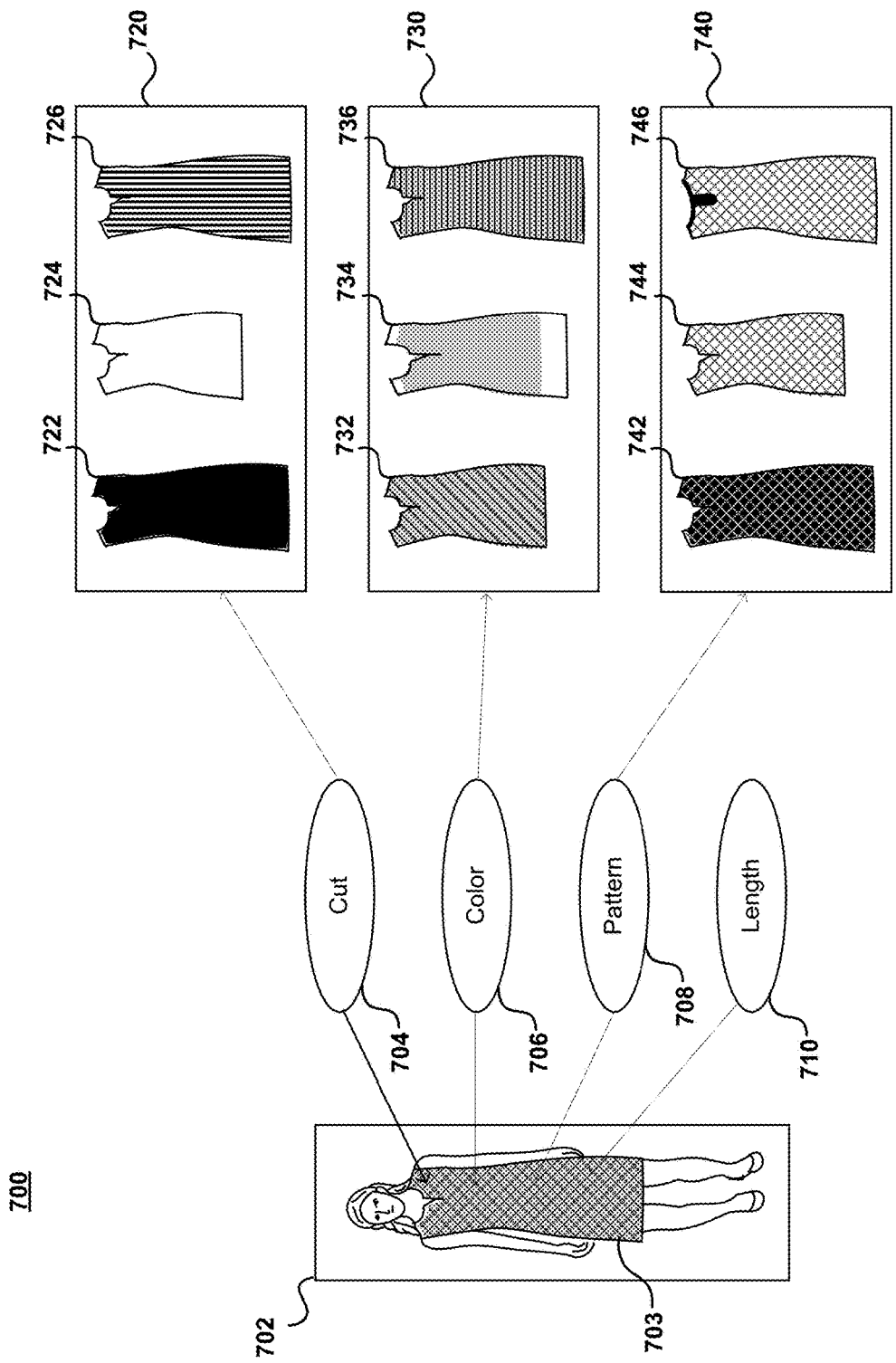

IMAGE SIMILARITY-BASED GROUP BROWSING

BACKGROUND

Images may be segmented into various regions in order to determine an item of interest represented in the image. In the case of items in a catalog of items, attempting to search for visually similar items in the catalog can be slow and inefficient with large catalogs of items for consumers who are looking to find a specific item quickly. Generally, users can search for items, such as apparel, based on various attributes or categories corresponding to the apparel. Such attributes or categories can include gender, size, and color. Typically, such attributes or categories need to be manually identified and associated with each piece of apparel. In some instances, such information may be provided by the seller of an item. However, in instances where the user wants to locate visually similar items to a particular item of interest, then users may have difficulty locating the item in large catalogs.

BRIEF DESCRIPTION OF THE DRAWINGS

Various embodiments in accordance with the present disclosure will be described with reference to the drawings, in which:

FIGS. 3A, 3B, 3C, and 3D illustrate stages of an example process for determining a torso region and/or upper body region that can be utilized in accordance with various embodiments;

FIG. 7 illustrates an example of image similarity-based group browsing in accordance with various embodiments;

DETAILED DESCRIPTION

Figure 1A:
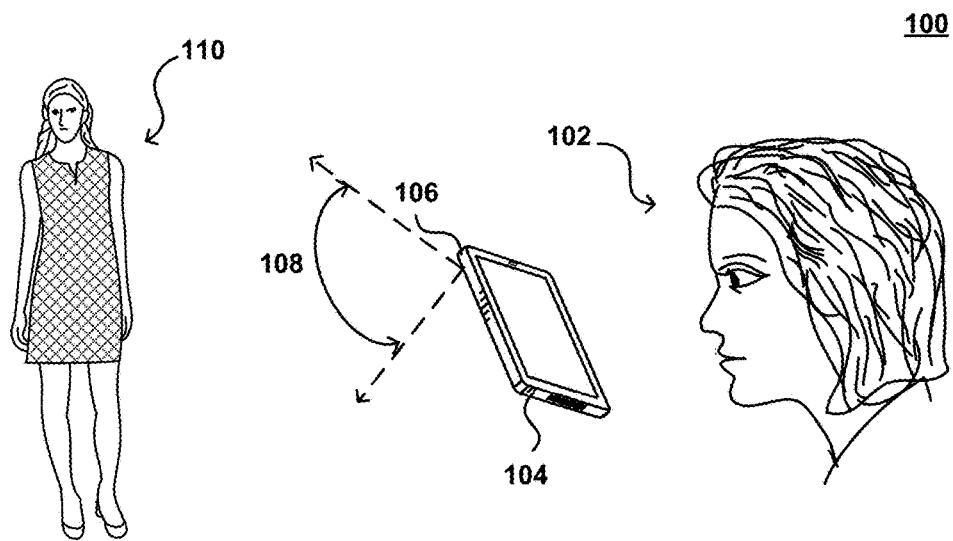
FIGS. 1A-1B illustrate examples of acquiring an item of interest in accordance with various embodiments.

Systems and methods in accordance with various embodiments of the present disclosure may overcome one or more of the aforementioned and other deficiencies experienced in conventional approaches for providing visually similar items to a query item (e.g., an item of interest in an image). In particular, various embodiments enable an improved user experience in the field of product recommendation. While clothing examples such as dresses will be utilized throughout the present disclosure, it should be understood that the present techniques are not so limited, as the present techniques may be utilized to determine visual similarity and present a set of visually similar items in numerous types of contexts (e.g., digital images, art, physical products, etc.), as people of skill in the art will comprehend. When products are retrieved in response to a request for visually similar items, for example to an item of interest in a query image, conventional approaches can provide an unwieldy presentation of numerous items, especially on smaller displays of mobile devices. By determining the visual similarity among potential items in a catalog to an item of interest according to visual attributes, user data, and other data, the potential items may be broken down into sets or groupings of items sharing one or more attributes of the item of interest or a query attribute. Thus, similar products can be grouped together and shown as a group, allowing users to obtain similar items to an item of interest in a visually economical display, and drill down into the groupings may selecting various visual attributes.

In an example, non-limiting embodiment, an online, computer-implemented, catalog of merchandise may contain images of a multitude of items for sale. A user may access the online catalog of merchandise by means of a computer, laptop, smartphone, tablet, television, or other similar device. A user may search for an apparel item in the catalog visually similar to an item of interest, for example, a dress captured in an image. As an example, a user may see a person wearing a dress that the user likes, and the user may take a picture of the person. The dress, as the item of interest, is identified, such as automatically as discussed herein, or by user selection, or other methods. The user may upload the image to a resource provider environment associated with the item catalog and request a display of visually similar items to the dress.

In the example embodiment, the approaches described herein obtain a plurality of visual attribute categories associated with an item; for example, color, pattern, occasion, etc. One or more of the visual attribute categories may have associated visual attributes, for example representing visual attributes of an item, such as "red," "plaid," "Christmas," etc. The query image (i.e., the representation of the item of interest) is analyzed, resulting in assigning one or more of the visual attributes to the item of interest. For example, the dress captured by the user may be analyzed, and based on the image analysis, visual attributes of "red," "plaid," and "Christmas" are assigned to the item of interest. While any number of categories and attributes are envisioned, in various embodiments not all categories may be utilized in the assigning of attributes to the item of interest, while in other embodiments multiple visual attributes from each category may be assigned to the item of interest. One or more items in the item catalog, are obtained, where at least some of the items have an associated image and are assigned one or more visual attributes from the one or more visual categories. For example, one dress in the catalog may be assigned "red," "striped," and "Valentine's Day." For some or all of the items in the item catalog, a visual similarity score is determined, where the visual similarity score indicates a visual similarity of the item in the catalog to the item of interest, and is based at least in part on a ranking of visual similarity of the item in the catalog to the item of interest with respect to one or more visual attributes of the item of interest. A visual similarity result set is generated for each of the visual attributes and ordered by the visual similarity score.

Although a dress is used in one example embodiment, many other types of wearable items may be analyzed to determine classifications/categories that the wearable items may fit into. Another embodiment can be analysis of an image of jeans, wherein the jeans may be classified as low cut, medium cut, or high cut. It will be readily apparent to those of skill in the art that many other classifications/categories may describe an apparel item. Embodiments may use numerical classifications such as measurements in inches, centimeters, etc. Other example categories for apparel item length classification may be associated with names of the type of clothing, such as Capri pants, crop pants, or cowboy cut jeans.

Various conventional approaches can attempt to identify visually similar items to a query image, but such approaches can be computationally expensive and not highly accurate. Additionally, current approaches fail to adequately prune the result set, especially with regard to particular visual attributes that may be selected by a user or implicitly determined, for example. This shortcoming is especially relevant on smaller displays, such as mobile devices, where presenting relevant, focused results to queries is paramount, not only for bandwidth purposes, but also for display space purposes where visual similarity and multiple images are involved. Various other applications, processes, and uses are presented below with respect to the various embodiments, each of which improves the operation and performance of the computing device(s) on which they are implemented, for example by providing highly visually similar and/or relevant images for display in an organized, economic fashion, as well as improving the technology of image similarity.

Figure 1B:
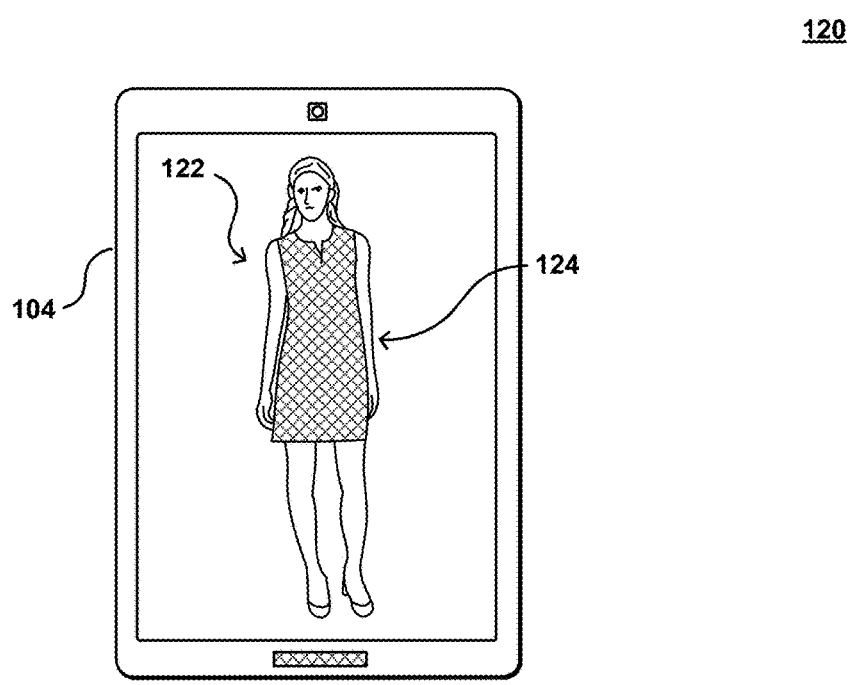

FIGS. 1A and 1B illustrate example situations of acquiring an item of interest in accordance with various embodiments. In the example of FIG. 1A, a person 110 is wearing an article of clothing 112 (in this example, a dress, although in various embodiments any type, cut, fit, or style of clothing may be used). The dress 112 in the example of FIG. 1A has a visual appearance that may be broken down into various visual attributes, as will be discussed more fully herein.

In the example of FIG. 1A, a viewer 102 is capturing image data of person 110 who is wearing the article of clothing 112. Viewer 102 is using a portable computing device 104 with a camera device 106 to capture image data contained in the capture angle 108 of the camera 106. For example, viewer 102 may be taking a picture or video data of person 110, or simply be viewing image data of person 110 on the screen of the device 104 as it is captured in real-time by the camera 106. In the example 120 of FIG. 1B, image data 122 being displayed on the screen of the computing device 104 of viewer 102 is illustrated, in which the dress may be identified as an item of interest 124 in the image data 122, as described more fully herein.

FIGS. 2A, 2B, 2C, and 2D illustrate example approaches for removing background from an image that can be utilized in accordance with various embodiments. According to various embodiments, an automatic segmentation process can be used to analyze the various images and attempt to segment the image into portions corresponding to a single person or entity, individual objects or items in the image, or other such segments. One example approach to segmenting an image is illustrated in FIGS. 2A-2D. A first step of such an approach can involve removing background portions of the image or otherwise removing from consideration any portions of the image that do not correspond to an item of interest, in order to improve the accuracy of the results and lessen the amount of data to be analyzed. In the situation 200 of FIG. 2A, an image 200 is obtained that includes an item 202 that is contained in an electronic item catalog, in this case the item being a dress being worn by a person. It should be understood that in some images a person might not be present, or only a portion of a person might be represented, among other such options. In the example situation 210 of FIG. 2B, a cropping process begins by starting at the corners and/or edges of the image and moving each side of a rectangle 212 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances, the background color will be known such that the process can move inward until a region with a color other than the background is determined. In other embodiments, the background color may need to be determined or background objects in the image removed using any appropriate process known or used for such purposes in other image-related processes.

Figure 2A:
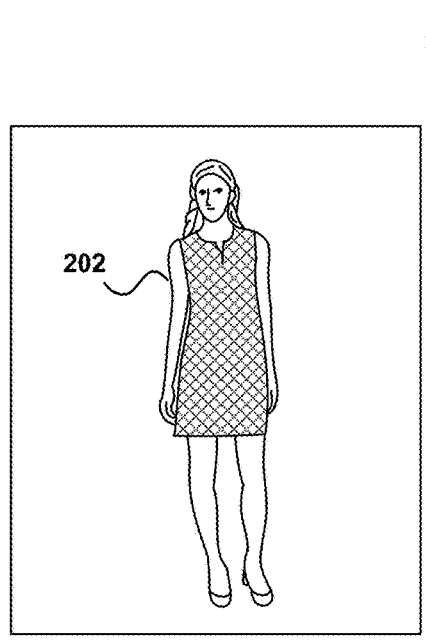
FIGS. 2A, 2B, 2C, and 2D illustrate example approaches for removing background from an image that can be utilized in accordance with various embodiments.
Figure 2B:
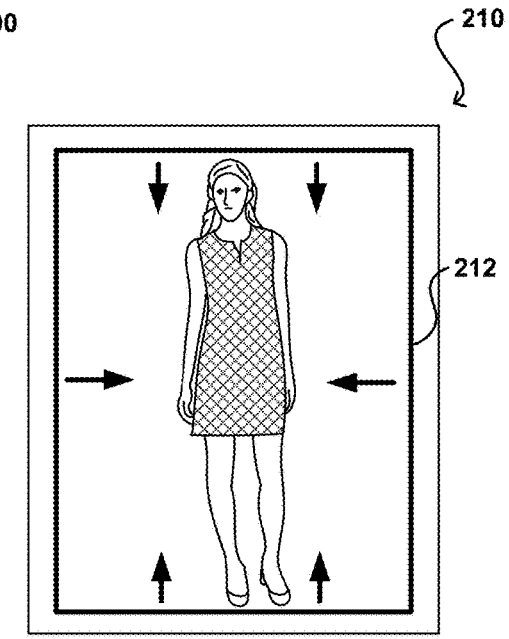
Figure 2C:
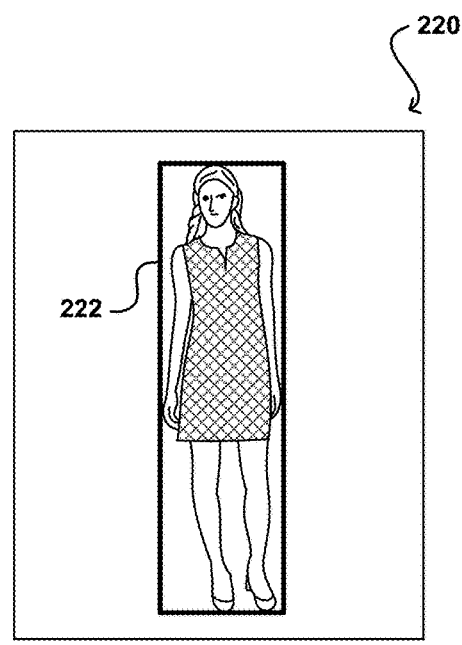

After each edge has stopped at an edge or contour of an object, a rectangularly-bound region 222 of the image will be determined that will include the item of interest, as illustrated in the example situation 220 of FIG. 2C. For images that contain models wearing various items, this can help reduce the search space to the items worn by a single person. The image in some embodiments can then be cropped to this region, such that the background pixels previously located outside this region in the image are removed from the image file.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In example situation 230 of FIG. 2D, an outline or mask region 232 can be determined that then corresponds to the foreground (or background) portion of the image. This can be used to crop the image based on the location of the object, or can be used to expand the object to the appropriate aspect ratio, as discussed elsewhere herein.

Figure 2D:
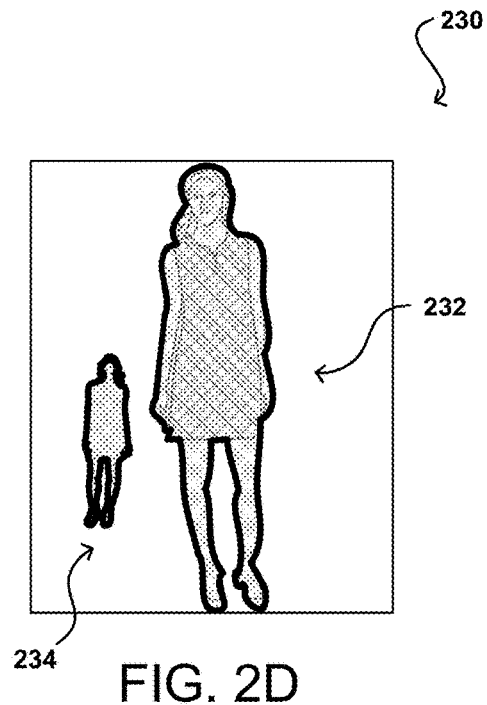
Figure 4A:
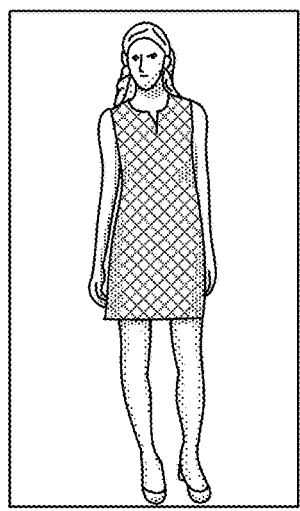
FIGS. 4A, 4B, 4C, and 4D illustrate stages of an example process for determining a clothing region of an image that can be utilized in accordance with various embodiments.
Figure 4B:
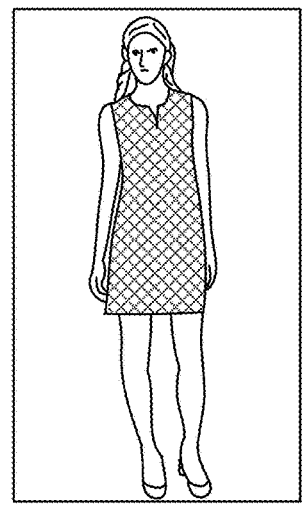
Figure 4C:
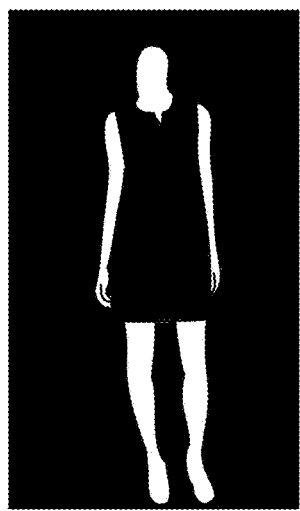
Figure 4D:
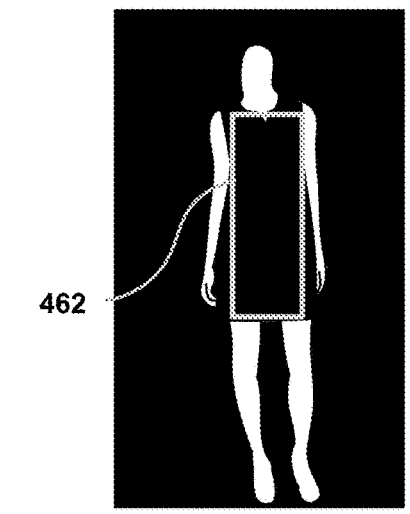

If the image includes multiple objects, such as a second person as illustrated in the example 230 of FIG. 2D, the connected components analysis can still connect the background regions, which can result in determining a second object region 234 in the image. Various approaches can then either consider these objects together or as separate objects for purposes of cropping or image match. For images with multiple such object regions, one or more rules or policies could be utilized that indicate to select only the top region, most central region, largest region, etc.

In some embodiments a probability function or other variation can be determined based at least in part upon the foreground region. For example, the foreground region can be assigned a single probability for each pixel location, or pixels towards the middle of the foreground region can be assigned higher probabilities than pixel locations near the edge (and outside) the foreground region. In some embodiments the probability outside the foreground region might be set to zero, while in other embodiments the probability might trail off with distance from the foreground region, hitting a probability of zero at, or near, the edge of the image. Various other probability functions and approaches determined based at least in part upon the location of the foreground region can be utilized as well within the scope of the various embodiments. A confidence value can be obtained for the location of the region as well, such as may be determined at least in part by the number/percentage of background pixels contained within that region, in at least some embodiments. It is expected that, in general, the item/object of interest will occupy at least a minimum amount of the pixels in the image as a whole, as well as in the determined foreground region. A normal distribution can be created based on this, as may be determined using an average with a standard deviation. Further, in some embodiments the background will have a determined color which may match the color of some of the items of interest contained within the images. The confidence score may be lower in such a situation, as many of the pixel values for the object would correspond to the background color, and it may be difficult to determine which portions correspond to the object and which portions correspond to the background without further analysis. In some embodiments, the number of pixels of background color within the determined region can be counted and then normalized to a score between 0 and 1, using a normal distribution, to provide the level of confidence Another visual cue can be analyzed using one or more features located in the image. This can include using an object detection process, as may be based upon a Viola-Jones algorithm, deformable parts model (DPM), or other object detection algorithm, process, or framework. In some embodiments a Deformable Part Model (DPM)-based detectors can be utilized, such as may be based on a histogram of gradient (HOG) feature and structural support vector machine (SSVM). Such a process can be used to locate specific features or objects such as the head, face, body, upper body, or torso of a user, among other such options. FIGS. 3A, 3B, 3C, and 3D illustrate stages of an example process for determining a torso region and/or upper body region that can be utilized in accordance with various embodiments. According to various embodiments, a next portion of the process involves cropping the image based at least in part upon a location of a face of the wearer in the image. It should be understood that reference numbers may be carried over between figures for similar components for purposes of explanation, but that such use should not be interpreted as a limitation on the various embodiments. It also should be understood that, for any process discussed herein, there can be additional, fewer, or alternative steps performed in similar or alternative orders, or in parallel, within the scope of the various embodiments unless otherwise stated.

As illustrated in the example situation 300 of FIG. 3A, the input to this module (or set of modules) can be the image including the representation of the object or item of interest 202, although in some embodiments the background portion from the prior step might be removed in order to reduce the amount of image data to be processed. From such an image, a face or head recognition process can be used to attempt to locate a face or head in the image, at least in the upper portion (e.g., top half or quarter) of the image. As illustrated in the example situation 320 of FIG. 3B, a location or bounded region 322 identifying the location of such a face can be determined using an appropriate location algorithm as discussed elsewhere herein. From this region, a torso region 342 can be determined as illustrated in the example situation 340 of FIG. 3C. Since the torso of a person is typically located below the head or face in an apparel image, and since the torso is generally represented as being wider than the head or face, a torso region 342 can be determined that has at least a minimum probability of including the item of interest if worn on the torso of the person whose face is located in the image. In this example, the region 342 is a rectangular region, although various other shapes can be utilized as well as may be based at least in part upon the probability relative to the face position. Further, the dimensions and location of the region can be based upon parameters of the human body, as a torso is likely to have a range of widths, lengths, and positions relative to a head region of a determined size and location. It should be understood that the region could have a single probability value or a distribution of probability values, as is described above with respect to the foreground region. Similarly, an object detection process or module can be used to locate an upper body region 362 of the image as well, as illustrated in the example situation 360 of FIG. 3D. The probabilities, as discussed previously, can be a fixed value for each pixel position in the region or might be distributed across the region, whether from a central point or from a point that is centered right to left but below center in the region (in the figure), as the apparel is likely to be located in a central location but below the face of the user, which will typically be represented in the top portion (e.g., top 20% or 25%) of the upper body region. It should be understood that terms such as "up," "down," and "top" are used for purposes of explanation and that other arrangements or directions can be used as well within the scope of the various embodiments as appropriate. In some embodiments the upper body region might be selected to start below the face or head region in the image, such that the location of highest probability might be in the center of the region.

According to various embodiments, a component or module can attempt to locate a clothing region that is located between (or otherwise positioned relative to) any or all skin regions of the image. FIGS. 4A, 4B, 4C, and 4D illustrate stages of an example process for determining a clothing region of an image that can be utilized in accordance with various embodiments. In this example, the cropped image can be used as input to the next portion of the process. In the example situation 400 of FIG. 4A, the obtained image including the representation of the object of interest will likely be a full color (e.g., 24 bit) image, or other such image with a conventional color depth. In order to locate the clothing region without utilizing a complex image recognition process, approaches in accordance with various embodiments can attempt to locate regions of skin color or skin tone that are positioned in a way that would be expected for a person represented in the image. The skin colors can have ranges of values that can depend at least in part upon the color space, color depth, etc. In order to improve accuracy, in at least some embodiments a version of the image is produced, as illustrated in the example situation 420 of FIG. 4B, which is quantized, or has a reduced color depth. Reducing the color depth to, say, 256 colors can cause the skin regions to have less color variation and thus be more likely detected as contiguous regions of skin color. From the quantized image, the color of each pixel in the image can be analyzed to determine whether each pixel is, or is not, colored with a color value that is within a determined range of skin tones. For pixels in that range, those pixels can be assigned a first value, such as 0. For pixels with colors outside the skin color range, those pixels can be assigned a second value, such as 1. The result can be a mask image (or mask data set), such as is illustrated in the example situation 440 of FIG. 4C, wherein the regions of skin are identified with respect to the non-skin regions. For example, the leg, arm, and head regions of the image are readily identifiable from the skin mask image. In some cases, the hair of a person may show up as a skin region in the skin mask, such as where the color of the hair is within the skin tone range of colors, but such appearance should not impact the determination of a clothing region as discussed herein. In order to determine a clothing region that is likely to include an appropriate image swatch region, a bounding box or other boundary can be used to determine a clothing region 462 inside the skin regions, as illustrated in the example situation 460 of FIG. 4D. As with the other regions, the probability can be of a single value within the clothing region or a distribution of values, as may decrease from a maximum probability value (e.g., 1.0, 0.8, 0.75, etc.) in the center of the clothing region, among other such options. As with other regions, a confidence score can be generated in some embodiments based at least in part upon the number or percentage of skin and/or background pixels contained within the region.

FIGS. 5A, 5B, 5C, 5D, 5E, and 5F illustrate an example approach to locating specific items represented in an image that can be utilized in accordance with various embodiments. Once a skin mask (or similar binary version) is created, that image can be analyzed to attempt to determine the presence of legs in the image, as well of the positions of any such legs. For example, in the situation 500 of FIG. 5A a scan (represented by the scan line 502) can start at, or slightly above, the half-way point of the image from top to bottom. This is a reasonable place to start as legs will typically be located in the bottom half of the image, and starting here helps to reduce false positives that might otherwise be detected in the top half of the image. From this point, the scan line can move line by line (or every other line, etc.) towards the bottom of the image and attempt to locate scan lines where transitions between skin and non-skin regions indicate the potential presence of legs. For example, in the situation 510 of FIG. 5B two scan line regions are illustrated where there are regions of skin and non-skin on the scan line. Any scan line that includes one or two areas of skin may be designated as a potential leg position, as the legs could be apart or could be together, where they might appear as a single skin region. A first pair of skin regions is designated by two segments 512, 514 that appear on the same scan line and are separated by a non-skin region. Similarly, a second pair of skin regions is also designated by two segments 516, 518 that appear on the same scan line and are separated by a non-skin region. Based on the scanning of the mask alone, it would be difficult to say with certainty which of these scan line segments correspond to legs and which correspond to arms.

Figure 5A:
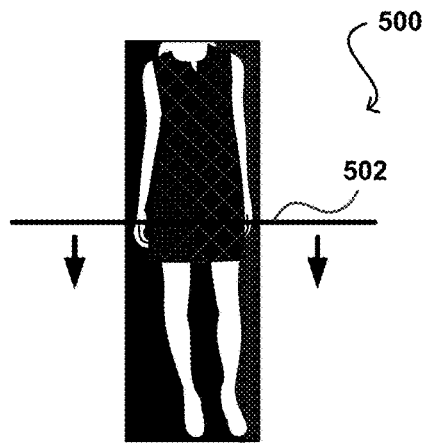
FIGS. 5A, 5B, 5C, 5D, 5E, and 5F illustrate an example approach to locating specific items represented in an image that can be utilized in accordance with various embodiments.
Figure 5B:
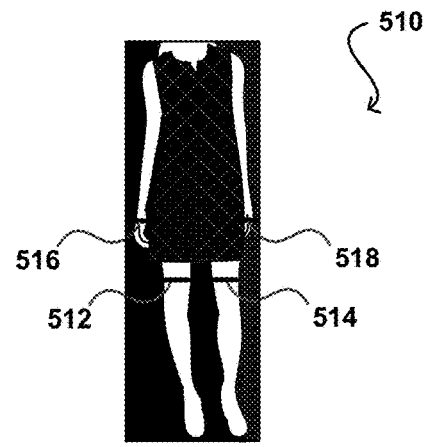
Figure 5C:
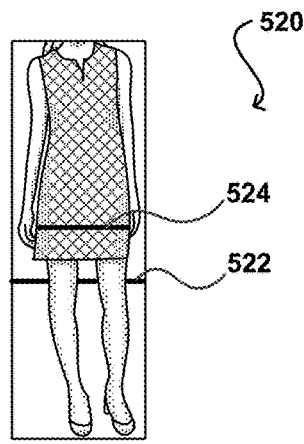
Figure 5D:
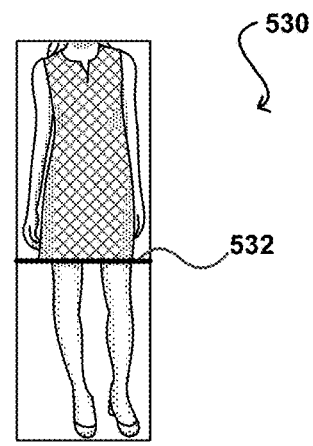

Accordingly, the process also utilizes a version of the image as illustrated in the situation 520 of FIG. 5C, which can be a full color, reduced color, or grayscale image, among other such options. In this example, the image is a grayscale image and areas of background can be distinguished from areas of non-background color. In this case, a set of scan line segments 522 corresponding to the first pair of segments 512, 514 in FIG. 5B shows that only background is located between the skin regions. Such a determination can be made by computing some edge features from a scan line or row of pixels, then processing these features using a classifier algorithm (e.g., hand-trained classifier, trained decision tree, etc.) to determine whether the row contains a dress and hands, a part of clothing, a pair of legs, etc. Based on at least this information, it can be determined from the example that the segments likely correspond to legs. A second scan line segment 524 corresponding to the second pair of scan line segments 516, 518 indicates that, based on the color value of the pixels along the scan line between the skin region, the area between the skin regions is not background, which indicates that these regions are likely not leg regions, as a dress that stops at the knees, for example, would not have anything (typically) between the legs of the wearer below the knee. Further, the skin regions may be determined to be too thin, too far apart, or otherwise have aspects or dimensions that are indicative of not corresponding to legs in the image. By performing such a process down some, most, or all of the lower half of the image, for example, it can be determined that the visible portion of the legs starts at a particular scan line 532 as illustrated in the situation 530 of FIG. 5D. This may not be a precise determination due to the shape and deformability of the dress or skirt, but such precision may not be necessary for at least some embodiments. Once located, the image can be cropped to yield an image as illustrated in the situation 540 of FIG. 5E. If a connected components-based approach was used as discussed elsewhere herein, the determination of background pixels between the leg regions can improve the confidence of the determination.

Figure 5E:
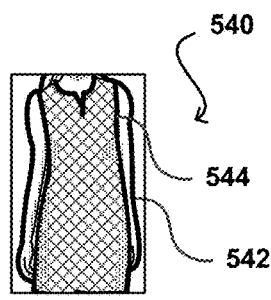
Figure 5F:
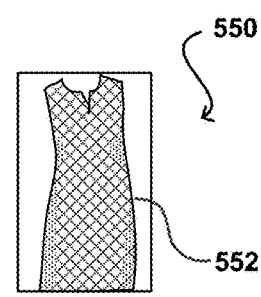

The image in the situation 540 of FIG. 5E is cropped top to bottom to approximately the location of an item of interest. From earlier steps, the contour 542 from the connected components analysis and a contour 544 from the skin tone region analysis can be used to further remove portions of the image from consideration. For example, any remaining points in the image outside the connected components contour 542 can be excluded from further analysis. Similarly, any points that were determined to correspond to regions of skin tone, inside a skin region contour 544, for example, can also be excluded, although as mentioned in some embodiments such an approach may not be used for image regions with a very high percentage of skin tone pixel values, or low deviation from skin tone, as that might correspond to a dress or other item having a color within the skin spectrum. If the skin tone and connected components contour are used to exclude points from consideration, the remaining image illustrated in the situation 550 of FIG. 5F will include pixel values almost exclusively that correspond to a region 552 of the item of interest. This can help to automatically generate an image of the item to be used with suggestions, for example, but also can enable the correct portion of the input image to be used for object identification or image matching, and will likely result in far more accurate results that matching against the entire image. While such an approach may not be as accurate as running the image through a very complex image analysis routine, the process will be much faster and require far fewer resources. If the image of FIG. 5F is run through an image match process and several possibilities show up with all with relatively low confidence scores, the image can be further analyzed to attempt to determine whether the region includes multiple items, such as a top and a skirt instead of a dress, such that the image portions for those items can be searched separately. This can be done, for example, by looking for different colors or patterns, doing an edge analysis, performing another connected components analysis, or performing another image segmentation process as discussed or suggested herein.

A segmentation process can thus be used to identify portions of an image that correspond to a particular item, so that the item can be identified using an object recognition algorithm against an appropriate electronic catalog or other data repository. If a match is located, information for the matching object can be used to attempt to search for related items. The search might be more valuable, however, if visual aspects of the image can be searched as well. For example, if the object is a red high heel shoe, then instead of only searching the specific matching shoe (which might only have a couple of data points) it might be advantageous to search against data for visually similar products, such as products with similar shapes, colors, patterns, textures, and other such aspects. This can also help when products in the catalog correspond to multiple sources, such that the same item might have multiple entries that may not be identifiable automatically without determining the visual similarities. By locating these similar objects the data for those objects can be aggregated and analyzed to determine a more accurate set of recommendations, or at least recommendations based on more data points.

In order to determine visually similar products in at least some embodiments, some analysis of the input image data for an item is analyzed in order to determine something about the visual characteristics of the item. In some embodiments, this involves the generation of one or more descriptors, such as histogram descriptors, that can be useful for searching and classifying content, among other such actions. Before describing approaches to creating and using histogram descriptors to search and classify content, it may be helpful to provide an example procedural context. In a process for searching histogram descriptors that characterize a collection of content, an index tree can be built using a set of histogram descriptors. Building the index tree may involve significant use of computation resources and time, such that this may correspond to a preparatory step to servicing search requests and/or performed relatively infrequently with respect to search request servicing and/or according to a schedule.

When a query is received, for example, a set of query descriptors/attributes may be obtained or determined for the query content, which may include an image containing a representation of an item of interest. For example, if the query content is not part of an electronic catalog and does not already have associated histogram descriptors, the system may generate histogram descriptors for the query content in a same and/or similar manner that the histogram descriptors are generated for the collection of content, as described below. Also, for example, if the query content is part of the collection then the histogram descriptors for the query content may be obtained from the appropriate data store. The index tree can then be searched to identify a set of candidate content histogram descriptors/attributes. Similarity scores can be calculated based on the distance between the one or more query histogram descriptors and the one or more candidate content histogram descriptors. For example, a search module may determine the distances with respect to the metric of the descriptor space in which the query histogram descriptors and the content histogram descriptors are located (e.g., as points or vectors). A set of nearest content histogram descriptors may be selected. For example, the search module may select a subset of the candidate content histogram descriptors nearest the query histogram descriptors with respect to the similarity scores. Content in the collection associated with the subset of nearest content histogram descriptors selected may be provided for presentation or otherwise utilized in a matching and/or recommendation process as described herein, resulting in a presentation of content from the collection that is similar to the query content.

In an example process for creating a first type of histogram descriptor for a collection of images, the histogram descriptors can be local-texture histogram descriptors that describe patterns that exist in individual images of the collection. For example, if an image is of a shoe that has laces and a checker-board pattern, the local-texture descriptor provides a representation of the checker-board pattern and the laces. An example process of creating local-texture histogram descriptors for individual images in a collection begins with identifying the feature points of the images of the collection. Feature points are specific points in an image which are robust to changes in image rotation, scale, viewpoint, or lighting conditions. Feature points are sometimes referred to as points of interest. For example, to identify feature points of an image, the image may be smoothed and down-sampled into image pyramids, each of which contain several pyramid images. Feature points may then be identified in the pyramid images by finding the Harris corner measure at different points in the pyramid images. For example, the local maxima in the Harris corner measure may be identified as feature points. According to some embodiments, these identified feature points are invariant to certain transformations of the images, like zooming, scaling and rotation of the image.

Figure 6A:
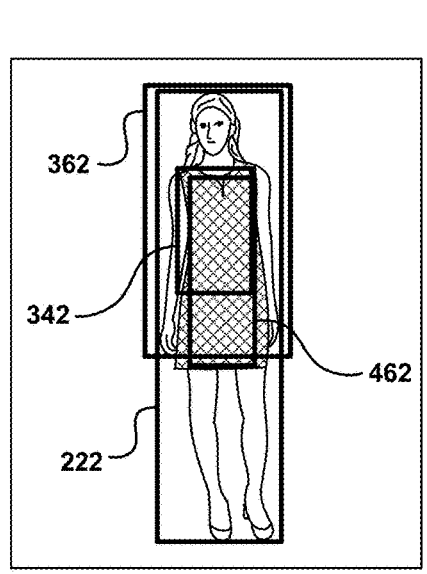
FIGS. 6A, 6B, 6C, and 6D illustrate stages of an example process for utilizing a probability map, based on the image regions, to determine image aspects that can be utilized in accordance with various embodiments.
Figure 6B:
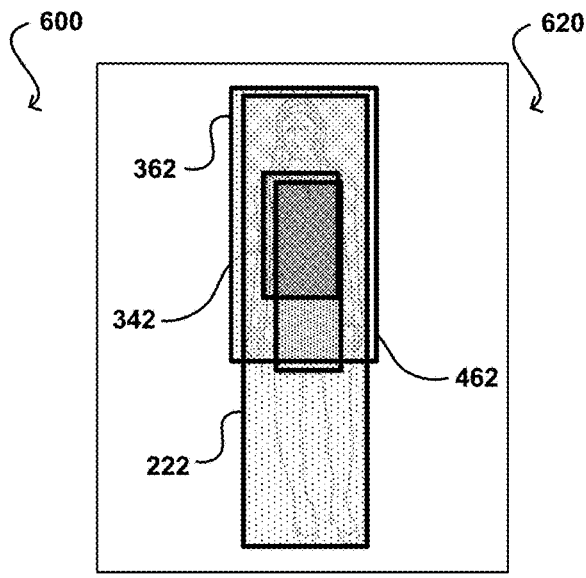
Figure 6C:
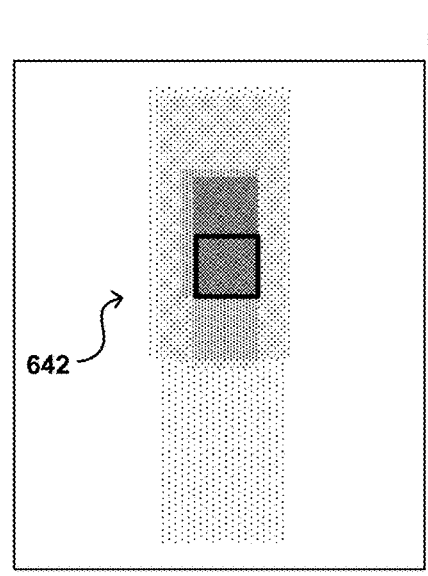
Figure 6D:
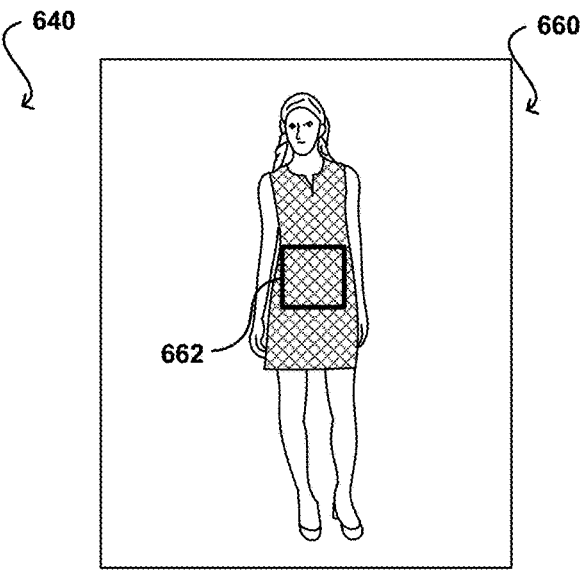

FIGS. 6A, 6B, 6C, and 6D illustrate stages of an example process for utilizing a probability map, based on the image regions, to determine image aspects that can be utilized in accordance with various embodiments. Once a set of regions has been determined for an input image, corresponding to the determined visual cues to be analyzed, the data for those regions can be collated or otherwise processed to attempt to determine one or more representative regions for the image. The regions can be analyzed using any of a set of processing approaches, as may include regression model-based collation or probability map generation, among others. A probability map-based approach will be described with respect to FIGS. 6A-6D. In the example situation 600 of FIG. 6A, the various regions 222, 342, 362, 462, 552 determined previously can be compared or aggregated in order to determine regions of different probability. FIG. 6A shows the relative location of the regions, while FIG. 6B shows those regions shaded with increasing darkness to represent increased probability. It should be understood that the figures show simple additive probabilities of regions having single probability values for all pixel locations, that the area with the largest number of overlapping regions can have the highest probability, and thus appear darkest in the figure. It should be understood that probabilities can be distributed, as discussed, such that the probability map can look more like a heat map of varying probability instead of having regions of discrete probability as illustrated in the example situation 640 of FIG. 6C. Further, although entire regions are shown in the example heat map of FIG. 6C, it should be understood that one or more candidate items/attributes/descriptors/areas, can be selected from each region, and the heat map or probability map can be generated using these candidate swatches instead of the entire regions.

Once the probabilities of the various regions are determined, at least one swatch region 642 can be selected that corresponds to the regions having the highest probability. The swatch can be selected to have at least a minimum size (e.g., number of pixels) and a minimum aspect ratio (i.e., not just a long, thin strip) in order to provide sufficient detail for the matching process, where the minimum size and aspect ratio can depend at least in part upon the process used and the level of accuracy desired. Using images without sufficient detail can result in image matches that are not sufficiently accurate, while requiring swatches with too much detail or size can result in some images not being able to undergo the matching process due to inability to locate such a swatch. In some embodiments the swatch is the largest region (square, rectangular, or otherwise) that will fit in a region having at least a minimum probability (e.g., at least 70% or more) of corresponding to the object of interest. Other approaches can be used as well, such as to select a swatch of predetermined size and shape positioned so as to maximize the average or total probability of the pixels contained within that region, among other such options. As illustrated, the location of the swatch region determined in FIG. 6C can be matched to the corresponding location 662 in the received image, as illustrated in the example situation 660 of FIG. 6D. The pixel values of this region then can be used for an image matching process, wherein the match is performed against the swatch region instead of against the entire received image. In some embodiments, a region of sufficiently high probability can be designated an apparel region, and one or more swatch regions can be selected from within that apparel region as discussed elsewhere herein.

Another approach involves using one or more regression models with the determined image regions. As discussed above, each region can include at least a set of coordinates defining the region in the image. Further, each region can have an associated probability, set of probabilities, and/or confidence score(s). Processing this data with one or more regression models can enable the regions to be fused according to the probability and/or confidence data in order to determine the image swatch region(s). Such an approach can involve at least one training stage for accuracy, and the regression model used can be based upon a linear regression model, random forest algorithm, Gaussian process, and the like. In some embodiments, the features used for the regression are in the form of a long vector obtained by concatenating the various region corner coordinates and their corresponding confidence values, thereby taking into account each detection result along with its confidence score. The long vector then can be used to perform training with the corresponding regression algorithm, and the trained model can be used to obtain the final image swatch location for the received image.

As mentioned, a variety of different modules can be used with such a process in order to determine one or more appropriate swatch regions for an image. In at least some embodiments it can be desirable to select at least some modules that are complementary to each other. For example, the background of an image might not have an appropriate background color or a person represented in the image might be wearing a skin tone outfit, which might cause one or more of the modules to not be able to determine a region with sufficient confidence. A selection of modules can be desirable that would still be able to determine an accurate swatch region even in these and other such situations. Further, detector algorithms can be trained to detect different portions of the body, as for certain apparel items it might be desirable to locate the lower body or entire body than the upper body, etc.

As mentioned, in some embodiments it may be possible to determine or extract multiple swatches from a determined apparel region. This can be useful for situations where the person represented in the image is wearing multiple items, such as a top and skirt as opposed to a dress. It is also possible that a single item might have regions with different patterns, among other such options. Thus, capturing only a single swatch might cause only one of the items to be represented in the search, or might cause a portion of each to be represented in a single swatch, which then might not result in any matches that include both patterns. Capturing multiple swatches enables multiple searches to be performed concurrently (or sequentially, etc.) in order to obtain results that match various items represented in the image.

In at least some embodiments, multiple candidate swatch regions can be analyzed within a determined apparel region. These candidate regions can be compared against one another in order to remove redundancies. For example, if a pattern matching algorithm indicates that the patterns within two candidate swatch regions match with a minimum level of confidence, one of the candidate swatch patterns can be removed from consideration for being redundant. In this way, only swatches that are sufficiently different will be selected for purposes of matching. In some embodiments these can all be automatically submitted to a matching process, while in other embodiments the swatch regions can be displayed over the image on a display screen of a computing device wherein a user can select one or more of the swatches to use to perform the search. In this way, the user can search for the precise item (or pattern) of interest in the case that swatches for multiple items (or patterns) are located in an image. In some embodiments, a maximum number (e.g., two or three) of swatches can be selected, where a criterion such as swatch dissimilarity can be used for selection. A comparison algorithm can be used that is resilient to small deformations in pattern appearance, which can be important for deformable items such as clothing where the pattern as represented in the image can vary based in part upon where the pattern is selected from the person wearing it. In some embodiments, a small set of candidate swatch regions can be selected initially from across the apparel region, and if the regions are determined to contain the same pattern then one can be selected as the swatch region without further analysis in order to conserve computing resources. The number of swatches selected for testing can be based on heuristics in at least some embodiments, in order to balance the amount of time and resources spent processing the data with the possibility that a certain pattern in an image might be missed. The sample regions can be at least partially overlapping or spaced apart, and can have the same orientation or different orientations and/or aspect ratios, among other such options. Other modules or processes can be used to attempt to determine locations of swatch candidates, as may include body pose detectors and the like.

FIG. 7 illustrates an example of image similarity-based group browsing in accordance with various embodiments. In the example of FIG. 7, a query image 702 is received, for example from a mobile computing device, and an item of interest 703 represented in the image data is identified, as discussed more fully above. Various visual attributes belonging to various visual categories 704-710 are assigned to the item of interest; for example, for visual category "Color" 706, it may be determined that the item of interest (hereinafter, "dress") is grey and therefore visually matches the "Grey" visual attribute (not shown) belonging to the "Color" visual category 706. Other visual attributes (not shown) are similarly assigned to the item of interest; for example, for "Cut," if the dress is determined to visually match an "A-Line" cut or a "Wrap" cut, then the appropriate visual attribute is assigned to the dress. For each visual category, multiple visual attributes may be assigned depending on the embodiment, while some visual categories may not have any visual attributes assigned. According to various embodiments, non-visual categories and/or attributes (e.g., "Teenager Dresses", "Maternity Dresses", etc.) may be utilized in the matching and/or grouping process (e.g., used to modify or otherwise affect similarity scores, etc.).

For some or all of the visual attributes (and/or categories in various embodiments) assigned to the dress, then items in the catalog (hereinafter, "catalog dresses") having a visual indicator assigned to them that is common to the dress are determined. For example, the dress is assigned a "Grey" visual attribute, and a set 730 of catalog dresses 732-736 also having a "Grey" visual attribute is determined. Likewise in the example, for the "Cut" visual category 704, where the dress is assigned a "Wrap" visual attribute, a set 720 of catalog dresses 722-726 also having a "Wrap" visual attribute is determined. For the "Pattern" visual category 708, where the dress is assigned a "Plaid" visual attribute, a set 740 of catalog dresses 742-746 also having a "Plaid" visual attribute is determined. In the example of FIG. 7, the "Length" visual category 710 does not have any items having a matching visual attribute to the dress.

According to various embodiments, in the event that an exact match exists in the catalog and is made between the item of interest and an item in the catalog (e.g., they are the same dress), then the matched dress from the catalog would appear in each set 720-740, which allows the matching techniques to get as close as possible to visual similarity of the item of interest.

Figure 8:
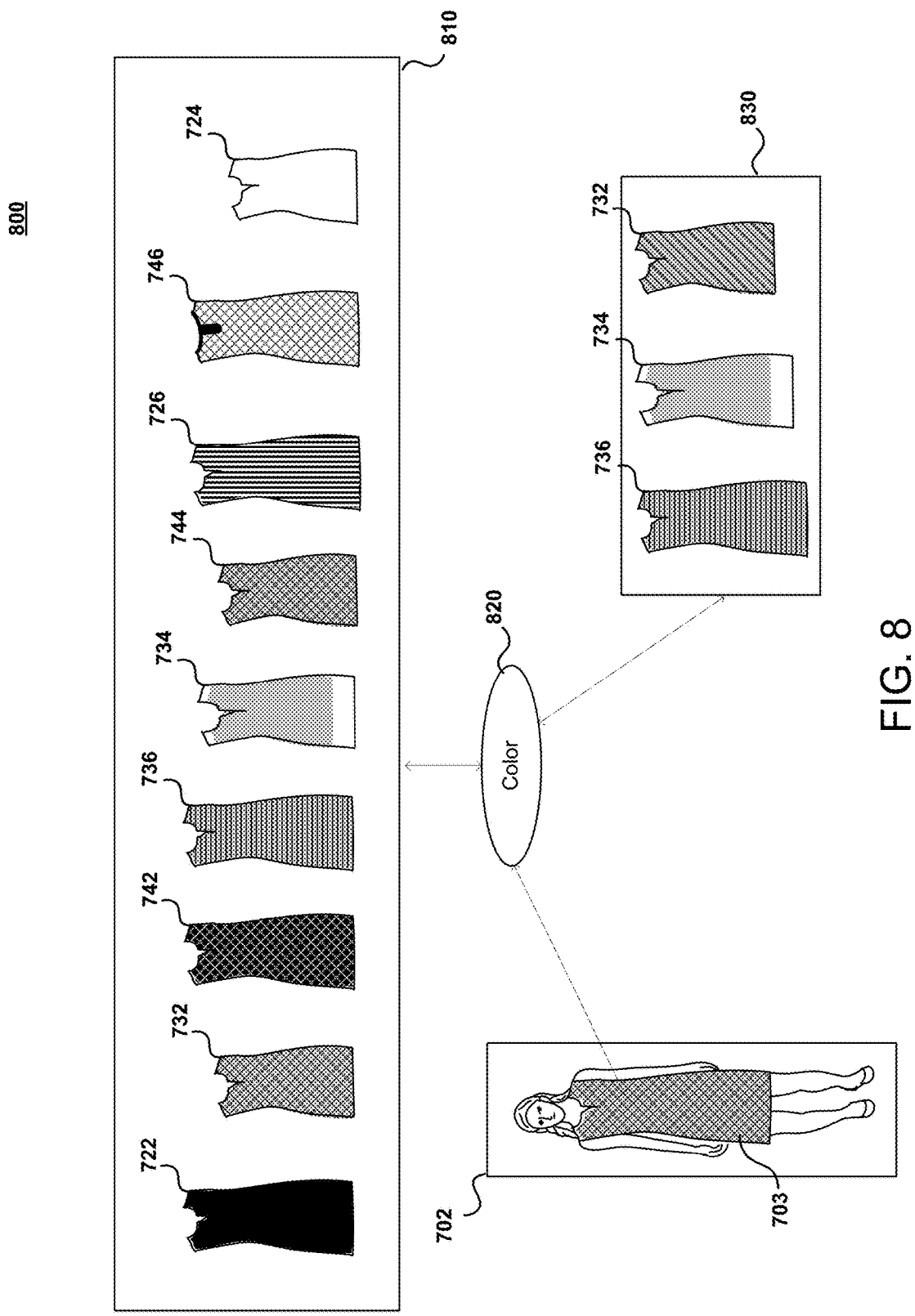
FIG. 8 illustrates an example of image similarity-based group browsing in accordance with various embodiments.

FIG. 8 illustrates an example of image similarity-based group browsing in accordance with various embodiments. In the example of FIG. 8, the query image 702 of FIG. 7 including the dress 703 is utilized to determine a matching set of visually similar catalog dresses. According to an embodiment, all of the catalog dresses 810 are ranked, according to a visual similarity metric/score, with regard to their visual similarity to the dress 703. The collection 810 of the catalog dresses 722-746 in FIG. 8 may be considered ranked according to their visual similarity score, with the most similar catalog dress 722 being on the left (i.e., having the highest visual similarity score), with the least similar catalog dress 724 being on the right (i.e., having the lowest visual similarity score). According to various embodiments, the catalog may have many more items than those illustrated in the example of FIG. 8, and the entirety of the catalog, or a subset thereof, may be ranked as in the example of FIG. 8.

According to the example embodiment of FIG. 8, a user seeking visually similar catalog dresses to the dress 703 is presented with various visual attributes; for example, all visual attributes commonly assigned to the dress 703 and the collection 810 of the catalog dresses 722-746. In the example of FIG. 8, the user has selected "Color." For example, a user may have captured a dress because she liked the color, not because she liked the cut, length, pattern, etc. By selecting "Color," and further by selecting the "Grey" visual attribute (not shown) in the visual category "Color," then the user can quickly identify the most visually similar catalog dresses that are "Grey," without having to be presented with a display that may include catalog dresses that have some visual similarity (e.g., cut, length, pattern, etc.), but not the particular category and attribute in which the user is interested: the color Grey.

Accordingly, once the user selects the "Grey" visual attribute, at least some of the catalog dresses having the "Grey" visual attribute are identified 830, and ranked according to their overall visual similarity (i.e., their visual similarity score). Therefore, in the example of FIG. 8, of the three "Grey" catalog dresses 732-736, they are ranked according to their visual similarity score as illustrated in the collection 810. Specifically, catalog dress 732 is the highest-ranked (e.g., the most visually-similar) catalog dress that is also "Grey," while catalog dress 734 is the next highest-ranked, and catalog dress 732 is the lowest-ranked "Grey" catalog dress.

According to various embodiments, multiple visual attributes (and/or visual categories) may be selected, with the resulting set of visually similar catalog items being ranked according to the techniques described herein. Also, visual attributes not assigned to the particular item of interest may be selected. In the example of FIG. 8, if the user may have selected "Green" instead of "Grey," even though the dress she took the picture of was Grey. Perhaps she simply wants to see the same dress, but in green. In that case, all catalog dresses matching the "Green" visual attribute would be selected and ranked according to their overall visual similarity to the item of interest, which in the case of a different color, may be an overall lower ranking than grey catalog dresses; however, because in various embodiments they will still be ranked according to their overall visual similarity within the "Green" group, the user will be presented with the most relevant visually similar catalog items.

Figure 9:
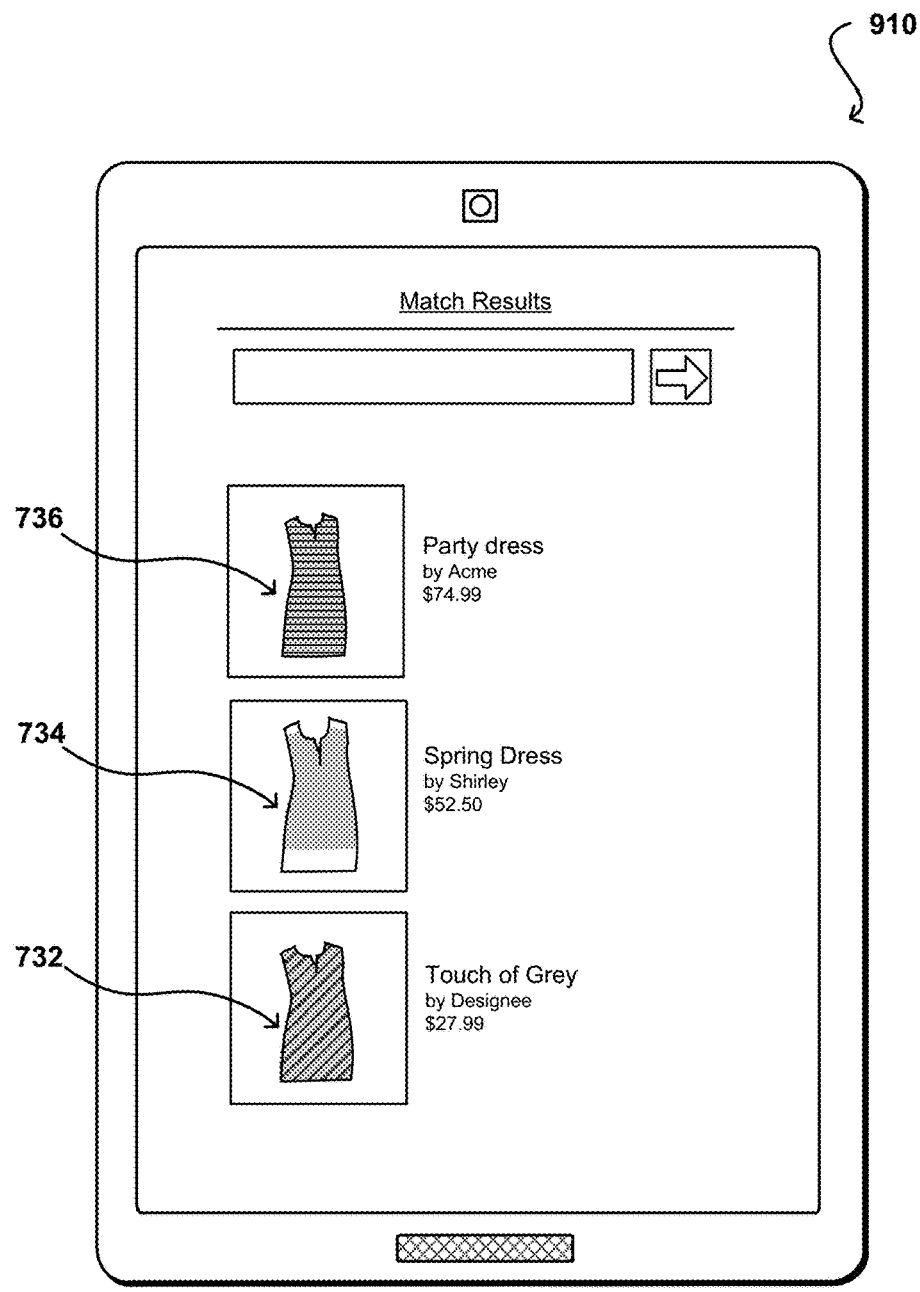
FIG. 9 illustrates an example of a search results interface that can be utilized in accordance with various embodiments.

FIG. 9 illustrates an example 900 of a search results interface that can be utilized in accordance with various embodiments. In the example of FIG. 9, a computing device 910, for example the same computing device 104 of FIG. 1, with which the query image 702 of FIG. 7 including the dress 703 was taken, is utilized to browse a grouping of visually-similar category items to the dress 703. In this example, the catalog dresses 732-736 from the example of FIG. 8 having the "Grey" visual attribute 830 are displayed for browsing, for example in the order according to their overall visual similarity score.

Figure 10:
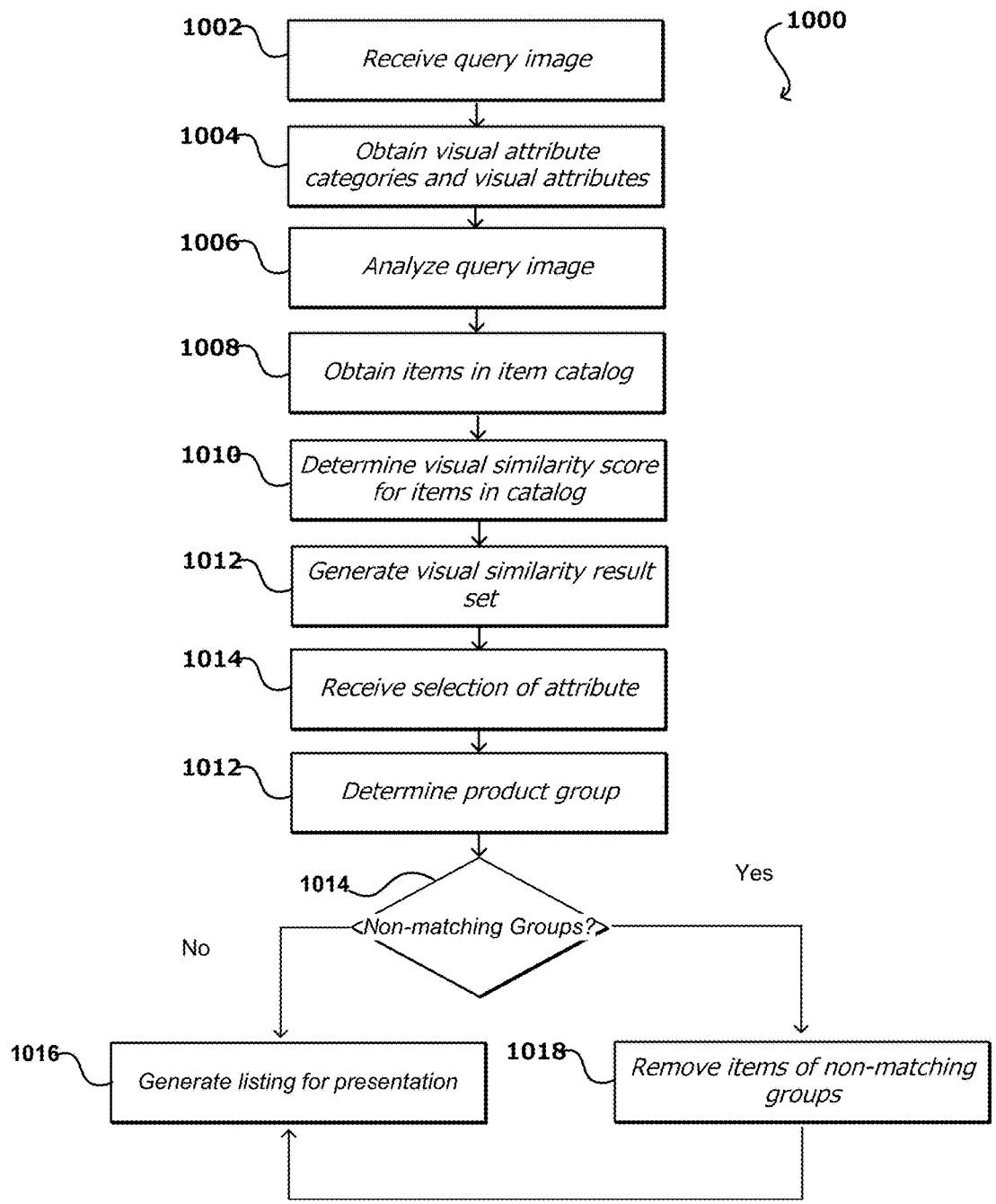
FIG. 10 illustrates an example process for image similarity-based group browsing that can be utilized in accordance with various embodiments.
Figure 13:
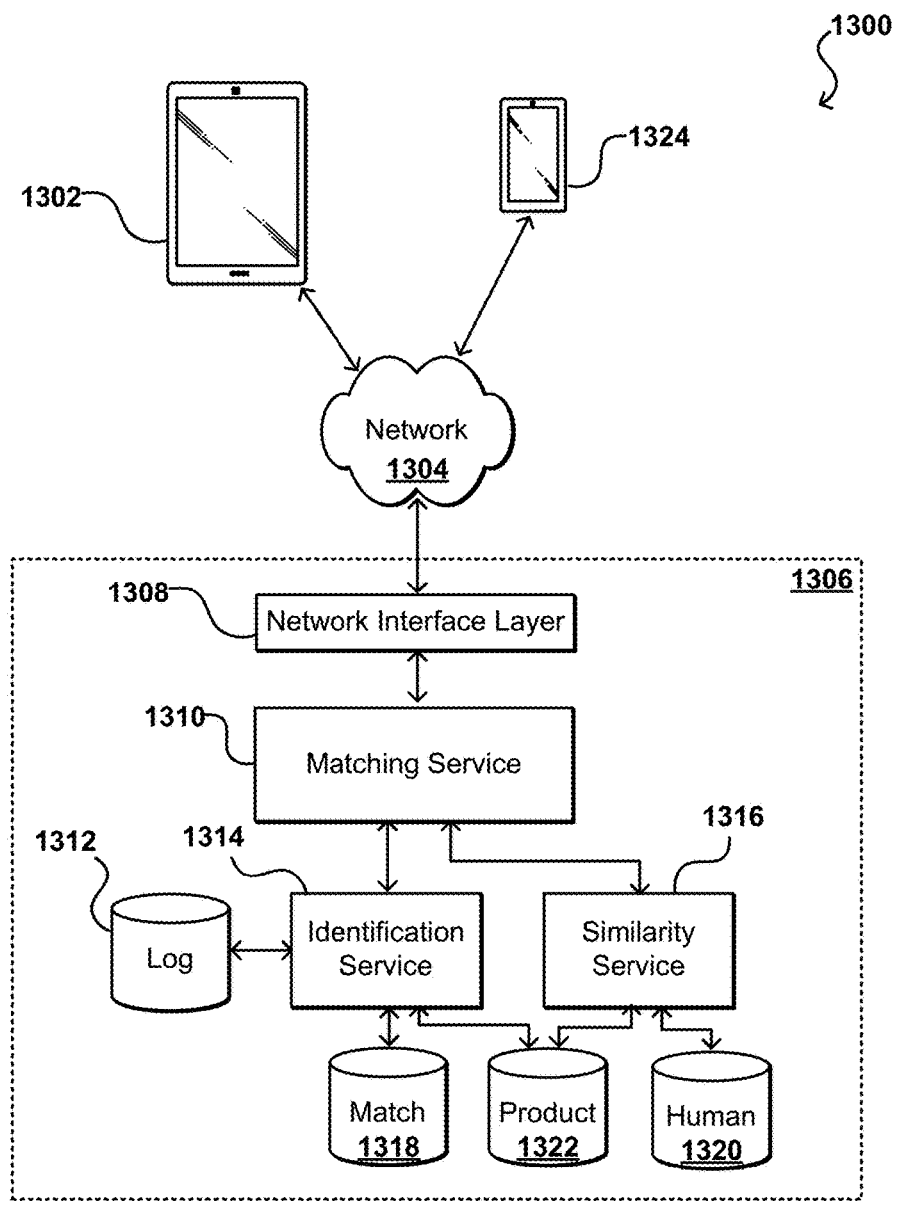
FIG. 13 illustrates an example system that can be used to perform image similarity-based group browsing in accordance with various embodiments.
Figure 16:
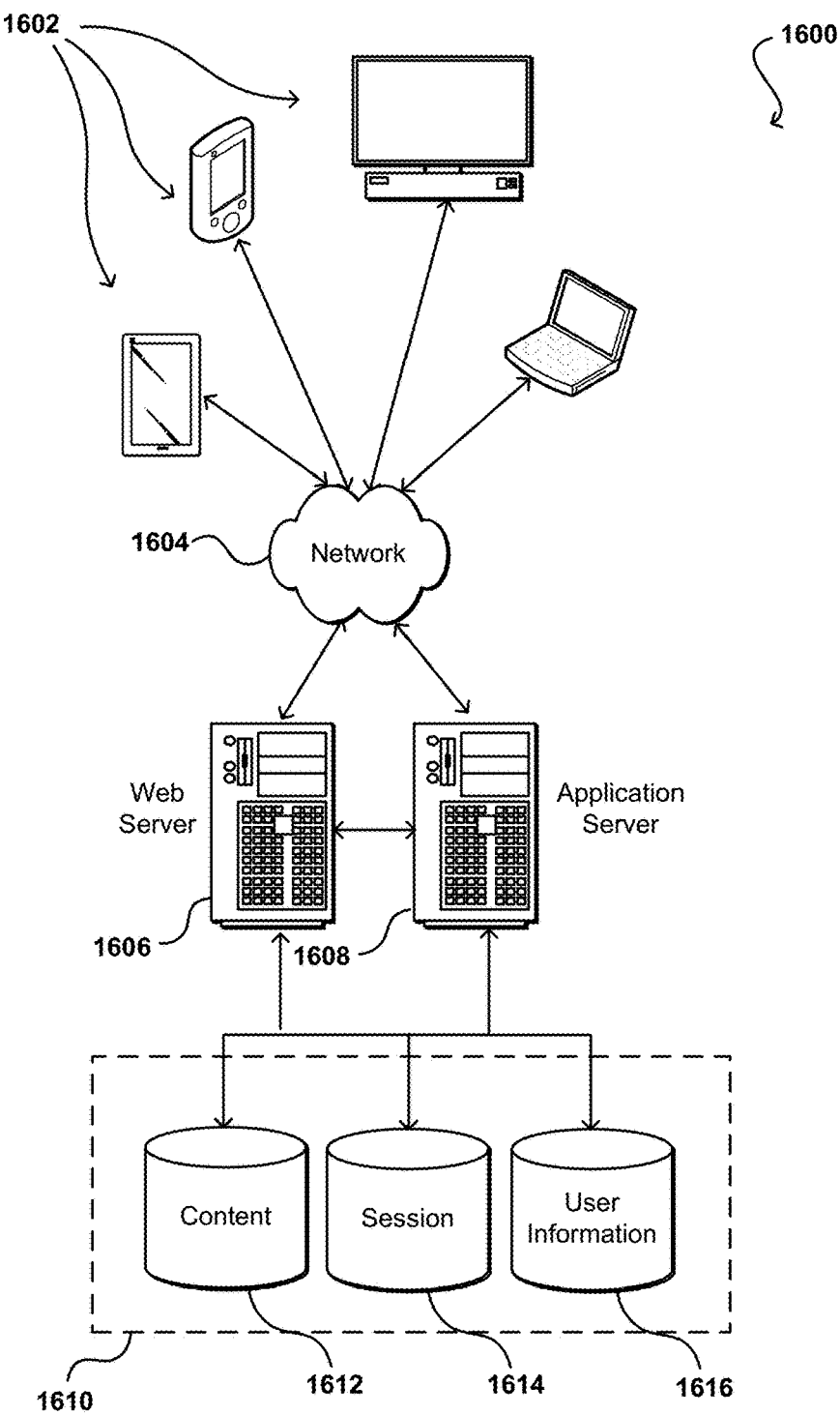
FIG. 16 illustrates an example environment in which aspects of the various embodiments can be implemented.

FIG. 10 illustrates an example process 1000 for image similarity-based group browsing that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In the example of FIG. 10, a query image is received 1002, for example from a mobile computing device, such as by taking a picture of an item of interest. Query images may be received in other ways as well, such as by uploading them from a web browser, selecting an image on an image-sharing site, etc. The query image contains at least one item of interest to a user. A plurality of visual attribute categories is obtained 1004, for example from an example computing environment as illustrated in FIG. 13 or 16. According to various embodiments, each (or a subset) of the visual attribute categories has one or more associated visual attributes, the visual attributes representing visual aspects of an item, such as a particular color or texture.

The query image is analyzed 1006, for example utilizing techniques described herein, in order to assign various visual attributes from one or more of the visual attribute categories to the item of interest. A plurality of items, for example in an item catalog as discussed herein and with respect to the example computing environments illustrated in FIG. 13 or 16, are obtained 1008. By obtained, it should be understood that the items may be selected from a database or otherwise identified, where the items may have one ore more images associated with each item. Of the obtained items, one or more may have one or more visual attributes assigned, for example based on the visual appearance of the one or more images, or on metadata associated with the item. A visual similarity score is determined 1010 for at least some of the items in the item catalog. According to various embodiments, the visual similarity score comprises a number or other metric capable of being used to compare and rank various items. The visual similarity score in various embodiments indicates a visual similarity of one or more of the items in the catalog to the item of interest, and the visual similarity score for a particular item being based at least on a ranking of a visual similarity of the particular item to the item of interest, the ranking being for one or more of the visual attributes shared between the item of interest and the particular item.

A visual similarity result set is generated 1012 for one or more of the shared visual attributes and is ordered according to the visual similarity score. The visual similarity result set in various embodiments includes items of the item catalog having at least one visual attribute matching those of the item of interest. A user, for example, may then select one or more visual attributes, for example by clicking a user interface element or similar method, resulting in a listing of items in the item catalog having the matching selected one or more visual attributes being generated and ranked according to the items overall visual similarity score. Other user interface element input data is envisioned; for example, in the event that an incorrect item of interest is identified in a query image, an indication could be received that selects or otherwise identifies the particular item of interest in which a user is interested. Once the selection is made, a product group for each (or a subset) item in the listing is determined 1012; for example, one of the products may be in the group "shoes," while another product may be in the group "dresses." A determination is made 1014 whether any items in the listing are of a different group than the item of interest prior to the listing being generated for presentation 1016; if so, then the non-matching items are removed 1018 from the listing prior to the listing being generated for presentation 1016.

According to an embodiment, user-generated visual similarity data may be used to determine a modified visual similarity score and thereby modify the order of the visual similarity result set. For example, a user who browses items in the catalog in order is providing data that may indicate the items are similar. As the user clicks from item to item, the sequence of the selections may be monitored and stored as metadata for each of the items, to be used to determine the similarity between items in the catalog.

Figure 11:
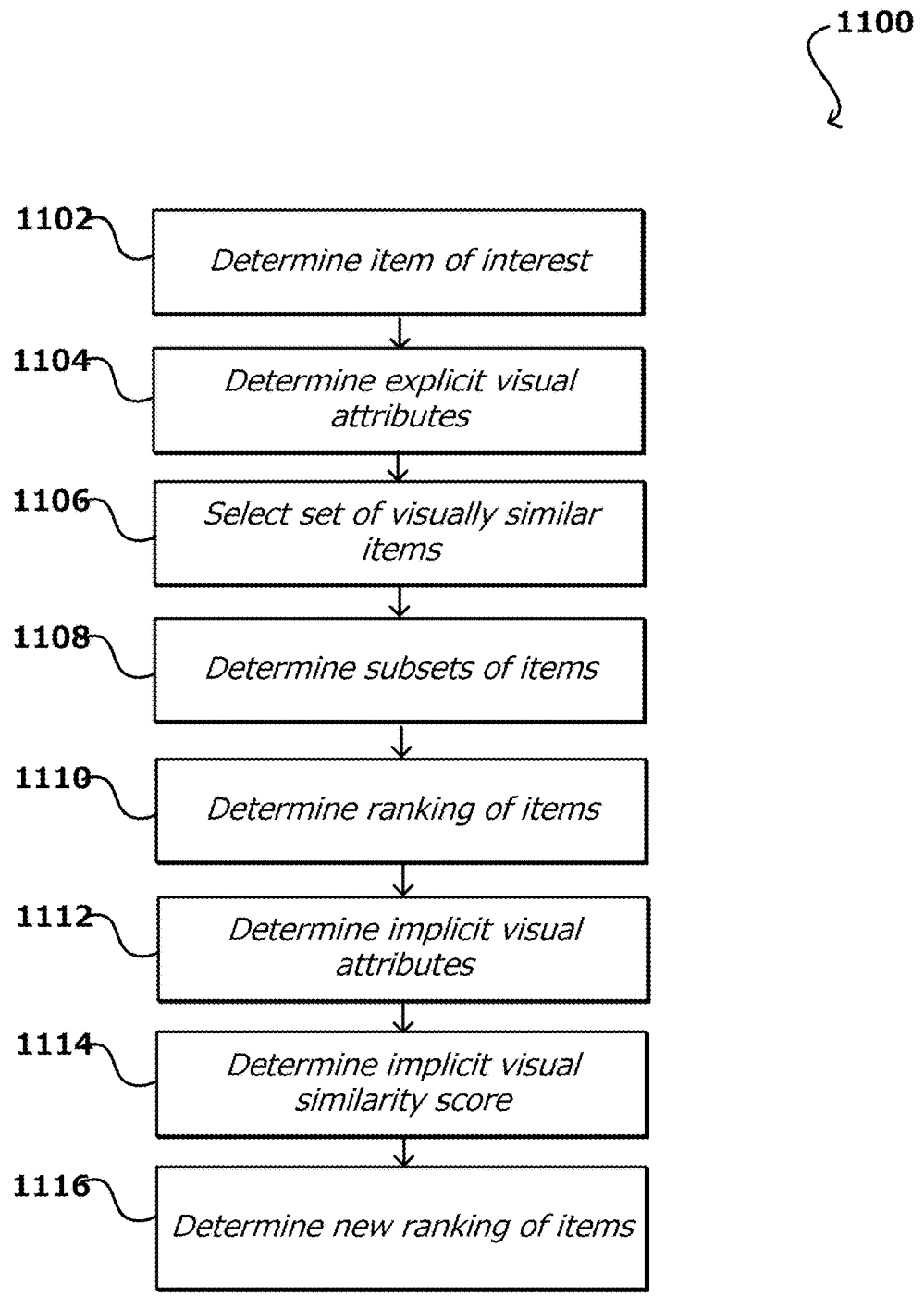
FIG. 11 illustrates an example process for image similarity-based group browsing that can be utilized in accordance with various embodiments.

FIG. 11 illustrates an example process 1100 for image similarity-based group browsing that can be utilized in accordance with various embodiments. In the example of FIG. 11, an item of interest is determined 1102, and explicit visual attributes associated with the item of interest are determined 1004. Examples of explicit attributes may include a property of the item itself; for example a color of the item or a style, while implicit attributes may include properties of the image in which the item is represented; for example, an exposure level of the image, a geographical location at which the image was taken, etc.

A set of visually similar items is selected 1006, for example based on the items being visually similar to the item of interest. In various embodiments, the visual similarity of the items to the item of interest are ranked, for example with a similarity score as discussed herein. Subsets of the items are determined 1108, the subsets comprising items having a visual attribute matching a visual attribute associated with the item of interest, and the items are ranked 1110, for example by the visual similarity score. Implicit attributes (visual or non-visual, in the case of metadata, for example) of the image containing the representation of the item of interest may be determined 1112, and an implicit similarity score (including visual and/or non-visual attributes/features/etc.) determined 1114 for one or more of the items in the set of visually similar items, which can be used to determine a revised ranking 1116.

Figure 12:
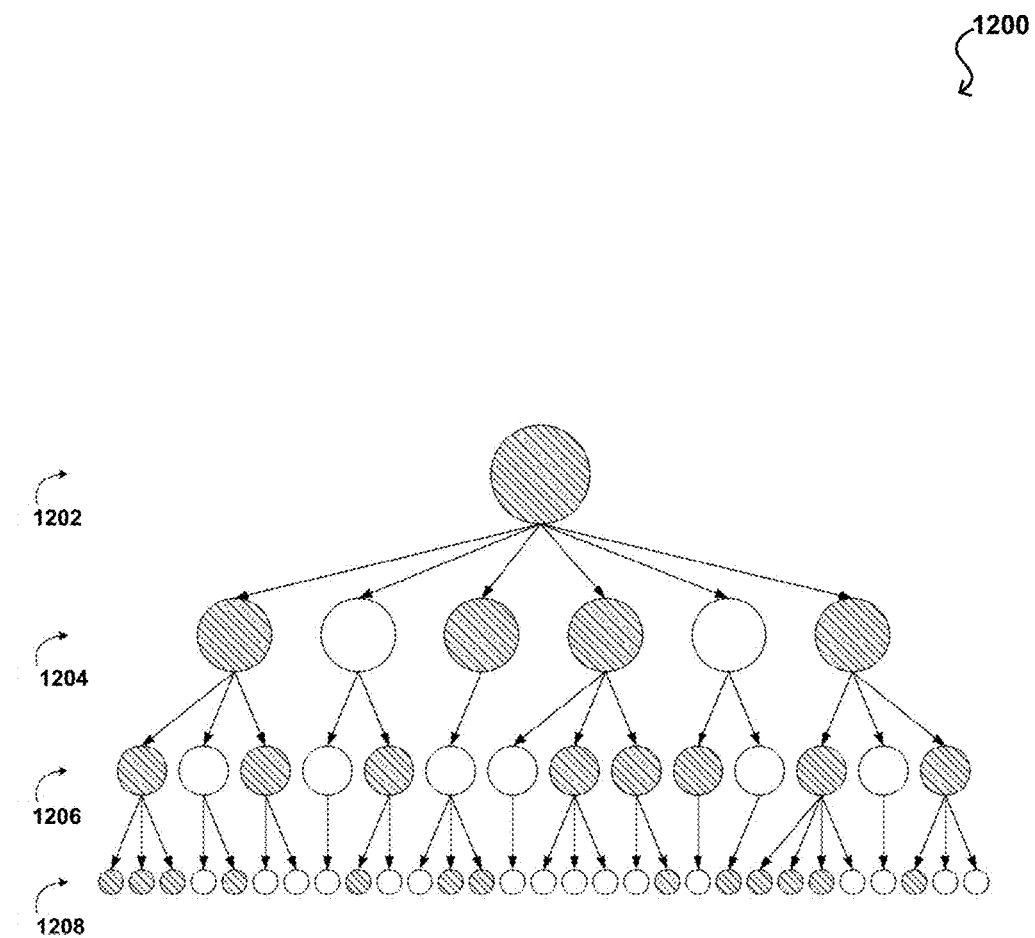
FIG. 12 illustrates an example categorization tree that can be utilized in accordance with various embodiments.

The collection of content, for example in an item catalog, item marketplace, etc. may be categorized by content categories of a category tree. FIG. 12 depicts aspects of at least a portion of an example category tree 1200 that can be utilized in accordance with at least one embodiment. The subset of the tree illustrated in FIG. 12 includes a subset of the categories in the category tree that are "visually significant" or otherwise visually related, as described herein with regard to visual similarity scores, rankings of visually related and/or similar items, visual attributes/categories, etc. The example category tree 1200 has a first level 1202 containing the root category of the category tree 1200, second and third levels 1204, 1206 containing categories with one or more sub-categories or child categories, and a fourth level 1208 containing childless categories or leaf categories of the category tree 1200. In FIG. 12, categories in the visually significant subset of the category tree 1200 are indicated by a circle filled with diagonal lines. Each visually significant category need not have a visually significant parent category in the category tree 1200.

Visually significant categories in the category tree may be referenced and/or defined by the visually significant category data. The example visually significant category data includes multiple data objects each corresponding to one of a visually significant category data object, a parent item data object, a child item data object, and an image data object. The visually significant category data object may reference and/or define a particular category of the category tree as visually significant with a category identifier (ID) corresponding to the category. For example, each category in the category tree may be associated with a uniquely identifying string of alphanumeric characters, and the category ID may be a copy of the uniquely identifying string of the visually significant category. The visually significant category data object may further reference an item set of content in the collection of content corresponding to items that are categorized by the category having the category ID. For example, each item referenced by the collection of content may be associated with a uniquely identifying string of alphanumeric characters (an "item ID"), and the item set may include copies corresponding to the categorized items. The visually significant category data object may yet further reference an image set of images corresponding to items referenced by the item set. For example, each image corresponding to content in the collection of content corresponding to one or more items may be associated with a uniquely identifying string of alphanumeric characters (an "image ID"), and the image set may include copies corresponding to the referenced images. The visually significant category data object may still further include a similarity descriptor set including copies of similarity descriptors (e.g., histogram descriptors) corresponding to the images referenced by the image set.

In at least one embodiment, content in the collection of content corresponding to items is also arranged in a hierarchical structure. Some content may correspond to parent items having child items. For example, where items correspond to physical objects, a set of child items may correspond to physical variations of a parent item such as variations in size, pattern, style, cut, and/or color, among others. Parent items may be represented in the visually significant category data with data objects corresponding to the parent item data object. Child items may be represented with data objects corresponding to the child item data object.

The parent item data object may reference a particular parent item with its item ID. Similarly, the child item data object may reference a particular child item with its item ID. The parent item data object may further reference the set of items for which the corresponding parent item is a parent with a child item set including item IDs of its child items. Similarly, the child item data object may further reference the set of items of which the corresponding child item is a child with a parent item set including item IDs of its parent items. The parent item data object may still further reference the set of categorize that categorize the corresponding parent item with a category set including the category IDs of those categories. The child item data object may still further reference a set of images associated with the corresponding child item with an image set including the image IDs of those images.

The image data object may reference a particular image with its image ID. The image data object may include reference to a set of items with which it is associated (e.g., is visually representative) with an item set including the item IDs of those items. The image data object may further include reference to a set of categories that categorizes the items referenced by the item set with a category set including the category IDs of those categories. Seemingly redundant references in the visually significant category data can facilitate effective and/or efficient searching category-aware visual similarity searches, for example, by speeding navigation of the data structure. The structure of the visually significant category data corresponds to a particular trade-off between search performance (e.g., in terms of request-response latency) and "in memory" storage (i.e., storage in a limited high speed memory resource). However, alternative structures and/or trade-offs are possible. For example, additional de-normalized data objects may be added to the visually significant category data that enhance search performance at a cost of an additional "in memory" storage requirement.

An example process can facilitate category- and attribute-aware visual similarity searches in accordance with at least one embodiment. A category and/or attribute tree can be established and/or built. For the purposes of FIG. 12, where "categories" are referenced, it should be understood that categories may encompass visual categories, visual attributes, and visual aspects, and these may be utilized in any combination, and may be related to any extent called for according to the various embodiments. Any suitable automatic and/or manual technique may be utilized to create and/or define categories in the category tree, set and/or define some categories in the category tree as sub-categories of other categories in the category tree, and/or assign content in the collection of content to appropriate categories in the category tree. Such techniques are well known in the art, and need not be described here in detail. A visually significant subset of the category tree can be identified. For example, a visually significant category data maintenance module may identify the visually significant subset of the category tree at least in part by establishing and/or updating the visually significant category data as described elsewhere herein.

A request may be received that specifies query content, and a query candidate category set can be identified with respect to the search request from among the visually significant subset. For example, the search request may be associated with one or more sub-trees of the category tree based at least in part on a search context of the search request such as prior navigation and/or browsing of the category tree. A visually significant category module or other component described herein may identify the query candidate category set at least in part by determining an intersection of the query-associated sub-tree(s) and the visually significant subset. The query candidate category set can also be optimized. For example, the visually significant category module may remove categories from the query candidate category set that have child categories in the candidate category set as described below.

The optimized query candidate category set may be searched for categorized content that is visually similar to the query content. Results of the search may be provided for presentation. For example, the search module may provide the search results for presentation with the search user interface. At least part of the build time computational work may include establishing and/or maintaining the visually significant category data. A set of high level categories of the category tree may be identified. Alternatively, or in addition, the set of high level categories may be specified in a configuration file (e.g., with XML).

A next (e.g., a first) of the set of high level categories may be selected. A lower set size threshold may be identified for the selected category. For example, the visually significant category data maintenance module may determine the lower set size threshold based at least in part on (e.g., as a linear function of) a total number of items categorized by the selected category. Alternatively, or in addition, the lower set size threshold corresponding to the selected category may be specified in the configuration file. An upper size threshold may be identified for the selected category. For example, a visually significant category data maintenance module, or other component as described herein may determine the upper set size threshold based at least in part on (e.g., as a linear function of) a total number of items categorized by the selected category. Alternatively, or in addition, the upper set size threshold corresponding to the selected category may be specified in the configuration file. It may be determined whether there are more high level categories for which to identify set size thresholds. An ignored category set may also be identified. For example, the visually significant category data maintenance module may identify a subset of the category tree to be ignored for the purposes of visual similarity searches. The visually significant category data maintenance module may identify the ignored category set based at least in part on one or more attributes of categories in the category tree. For example, where the categories of the category tree categorize content in the collection of content corresponding to items of apparel such as shoes, the categories may have an attribute characterizing them as corresponding to a wearable dimension of the item of apparel (e.g., size) or a non-wearable dimension (e.g., color), and the visually significant category data maintenance module may identify the categories corresponding to wearable dimensions as part of the ignored category set. Alternatively, or in addition, categories in the category tree that are to be added to the ignored category set may be specified explicitly (e.g., with an "ignore for purposes of visual similarity" attribute) and/or in the configuration file.

A candidate set of visually significant categories may be established. For example, a visually significant category data maintenance module may add each category in a sub-tree of the category tree that is rooted at one or more of the categories in the high level category set identified to the candidate set of visually significant categories. A next (e.g., a first) category in the candidate set of visually significant categories may be selected. It may be determined whether the selected category is in the ignored category set. It may be determined whether the selected category is associated with a visual distinction. For example, the visually significant category data maintenance module may determine whether the selected category is associated with a visual distinction based at least in part on one or more attributes of the selected category (e.g., an "is visually distinctive" attribute). Alternatively, this step may be omitted so that each category in the candidate set of visually significant categories that is not also in the ignored category set is assumed to be associated with a visual distinction.

An image set associated with the selected category may be determined. For example, the visually significant category data maintenance module may determine a set of images associated with content in the collection of content corresponding to items that are categorized by the selected category. It may be determined whether a size of the image set (e.g., the number of images in the image set) is greater than the lower set size threshold. The visually significant category data may be updated with respect to the selected category. For example, the visually significant category data maintenance module may create a visually significant category data object corresponding to the selected category, as well as creating and/or updating parent item data objects, child item data objects, and/or image data objects referenced by the visually significant category data object corresponding to the selected category. The selected category may, at least in part, be thereby designated as visually significant. It may be determined whether there are further categories in the candidate set of visually significant categories to consider.

The data set utilized in various embodiments may be trained to classify new data, such as according to FIG. 12 and/or utilizing machine-learning techniques including neural networks and deep neural networks.

Examples of machine learning include principal component analysis (PCA), neural networks, support vector machines (SVM), inductive learning, adaptive boosting (Adaboost), deep learning, among others. In PCA, eigenvectors are computed on a training set of images known to include objects corresponding to a particular classification to determine the covariance matrix of the training set. Training images known to include the classified are projected onto "a classified object subspace" and clustered. The distance between a region of each training image known to include the classified object and the classified object subspace is computed for the training image. The distance from the classified object subspace is used as a measure of whether a query image includes a classified object, and the distances from the classified object subspace form a "classified object map." An object or point of interest can be detected to be presented in a query image from the local minima of the "classified object map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Näive Bayes classifier estimates the local appearance and position of object at multiple resolutions. At each scale, a training image is decomposed into subregions and the subregions are further decomposed according to space, frequency, and orientation. The statistics of each projected subregion are estimated from the projected samples to learn the joint distribution of object and position. An object is determined to be within an image if the likelihood ratio is greater than the ratio of prior probabilities.

Inductive learning approaches include decision tree or random forest learning. Decision tree learning uses a decision tree as a predictive model which maps observations about an object (e.g., class-labeled training data) to conclusions about the object's target value (e.g., classification). A decision tree, for example, is a flow-chart-like structure wherein each internal (i.e., non-leaf) node represents a test on an attribute, each branch denotes the outcome of the test, and each terminal (i.e., leaf) node represents a class label or classification. Decision-tree learning can be based on Iterative Dichotomiser 3 (ID3), C4.5, Classification and Regression Tree (CART), Chi-squared Automatic Interaction Detector (CHAID), Multivariate adaptive regression splines (MARS), among others. Random forest learning uses a number of decision trees to improve the classification rate.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a candidate of a classified object if the difference of the sum of pixels within two regions meets a threshold θ for a Haar-like feature determined during the training stage. Viola-Jones further utilizes the concept of attentional cascading which observes that within an image, most sub-windows are not instances of the classified object. Thus, smaller and more efficient classifiers can be used to reject sub-windows unlikely to be the classified object at earlier stages of the detector while keeping almost all of the positive instances. More complex classifiers are used at later stages to examine candidates that have not been rejected as candidates of the classified object.

Deep learning involves modeling high-level abstractions in data using multiple non-linear transformations. Deep learning techniques are based on the premise that images can be represented in many ways but, from exemplars, certain representations can make it easier to learn tasks of interest, such as object classification of an object represented in an image. Deep learning techniques include deep neural networks, convolutional deep neural networks, and deep belief networks. As discussed, in addition to the object classification stage, machine learning techniques can also be implemented be at other stages of the object recognition pipeline, including image segmentation (e.g., separating the query object from the background and other objects or classification of pixels as boundary pixels), image matching (e.g., selecting a subset of similarity measures that best determines matches), global feature extraction (e.g., predicting high-level attributes which can be leveraged for multi-modal approaches for object classification), and/or vocabulary building, among other stages.

FIG. 13 illustrates an example environment 1300 in which image similarity data, in some embodiments along with subjective user data, can be captured, analyzed, and utilized to generate similarity determinations in accordance with various embodiments. In this example, a user of a computing device 1302 is able to provide information relating to an item of interest. As discussed, this can involve selecting a page relating to that item, capturing an image of that item using a camera of the computing device 1302, uploading an existing image of that item, etc. The information for the item, which can include image, video, or text information, among other such options, can be transmitted from the computing device 1302 across at least one appropriate network 1304 to attempt to obtain information relating to the item. The network 1304 can be any appropriate network, such as may include the Internet, a local area network (LAN), a cellular network, and the like. The request can be sent to an appropriate content provider 1306, as may provide one or more services, systems, or applications for processing such requests. The information can be sent by streaming, uploading, or otherwise transferring the information using at least one appropriate communication channel.

In this example, the request is received to a network interface layer 1308 of the content provider 1306. The network interface layer can include any appropriate components known or used to receive requests from across a network, such as may include one or more application programming interfaces (APIs) or other such interfaces for receiving such requests. The network interface layer 1308 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 1310. A matching service in this example includes components operable to receive image data about an item, analyze the image data, and return information relating to one or more items that are determined to match an item in the received data.

The matching service 1310 in this example can cause information to be sent to at least one identification service 1314, device, system, or module that is operable to analyze the data, such as an image or video, and attempt to locate one or more matches for an item reflected in the data. In at least some embodiments, an identification service 1314 will process the received data, such as to extract points of interest or unique features in a captured image, for example, then compare the processed data against data stored in a matching data store 1318 or other such location. In other embodiments, the unique feature points, image histograms, or other such information about an image can be generated on the device 1302 and uploaded to the matching service, such that the identification service can use the processed image information to perform the match without a separate image analysis and feature extraction process. Certain embodiments can support both options, among others. The data in an image matching data store 1318 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The matching service 1310 can receive information from each contacted identification service 1314 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as a similarity service 1316 that is capable of locating information about one or more items that are determined to be similar to a located potential match.

In at least some embodiments, a similarity service 1316 might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the similarity service 1316 can utilize data from the matching service 1310, such as an identifier for an object determined to match the item of interest, in order to locate products, in a product data store 1322 or other such location, which are offered through the marketplace and that match, or are otherwise related to, the identified object. As discussed, the similarity service 1316 can look at products related to the identified item of interest, and can determine the relatedness scores (e.g., visual similarity scores, etc.) for at least a portion of those products with respect to the item of interest. In at least some embodiments, the similarity service can extract subjective human-generated data from at least one human generated data store 1320 for use in determining appropriate weightings, factors, or other adjustments to be used in determining the similarity scores for each pair of items, such as selection input (e.g., interactions, browsing, etc.) corresponding to browsing items in the item catalog/marketplace. As discussed, data specific to the user making the request can be utilized as well in at least some embodiments. The similarity service can then rank the potentially similar items by the generated similarity scores, and can provide at least a determined number of the top ranked results (or other appropriate selection) to the client device 1302 as a set of similar items, for example based on ranking the items, in some embodiments including additional rankings such as according to visual attributes, visual categories, etc. If the user of the client device 1302 selects any of these similar items for viewing or purchase, or does not select one or more of these items, that information can be fed back into the similarity service 1316 for use in adjusting a weighting of one or more item descriptors (e.g., visual attributes, etc.) for that type of item that are used to generate the similarity scores. For example, if the user does not express interest in any of the items, the weightings might be moved back toward an even weighting. If the user selects only items that are of a similar color, the color descriptor might get a heavier weighting, perhaps within a group of items corresponding to a visual attribute. Various metric learning approaches can be used to continually monitor user interactions and additional items in a training set, for example, and update the similarity data over time. When a subsequent request for that type of item is received from a user of another device 1324, for example, the updated weightings can be used to determine a set of updated ranking scores, and select a set of suggested items that might be the same as, or different from, the set that was presented to the user of the first device 1302. The ability to dynamically adjust the weighting factors also enables the system to adapt to changes in preference, such as where relative preferences for similar styles or color vary with trends over time. In some embodiments, information for the selected similar items can be written to a log data store 1312 or other such location in order to assist with future matches or suggestions, as well as to help rate a performance of a given similarity service. As should be understood, each service can include one or more computing components, such as at least one server, as well as other components known for providing services, as may include one or more APIs, data storage, and other appropriate hardware and software components.

Figure 14:
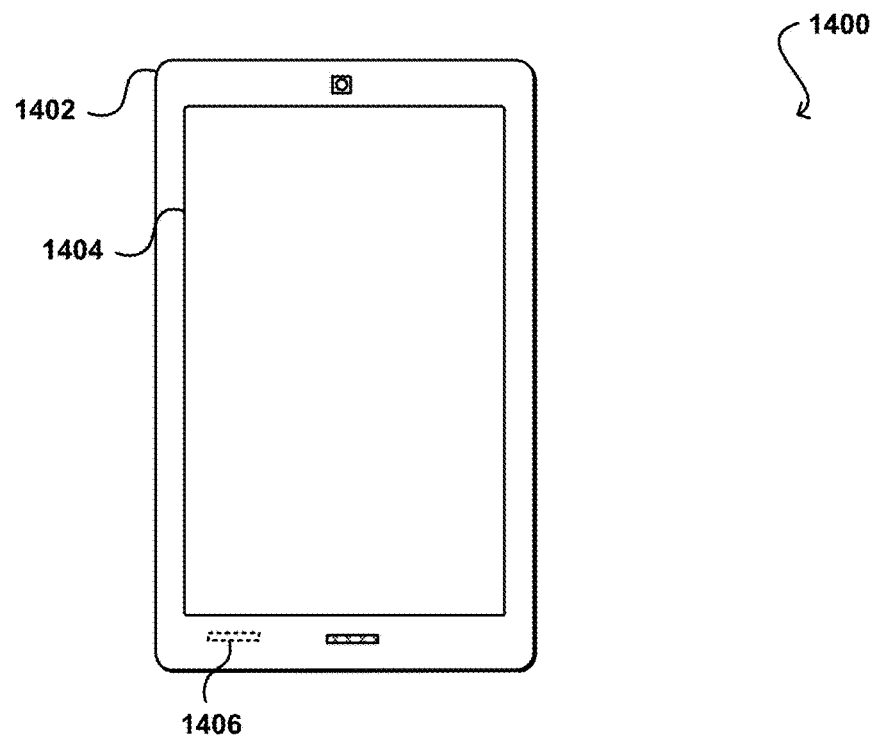
FIG. 14 illustrates an example computing device that can be utilized in accordance with various embodiments.

FIG. 14 illustrates an example computing device 1400 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), augmented and/or virtual reality wearable devices, television set top boxes, and portable media players, among others.

Figure 15:
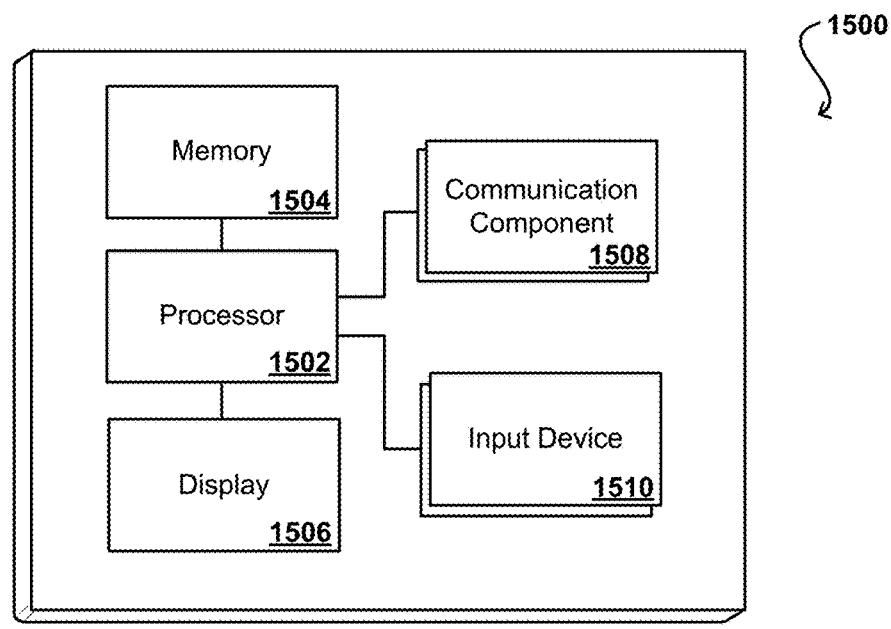
FIG. 15 illustrates an example configuration of components of a computing device, such as the device illustrated in FIG. 14.

In this example, the computing device 1400 has a display screen 1404 and an outer casing 1402. The display screen under normal operation will display information to a user (or viewer) facing the display screen (e.g., on the same side of the computing device as the display screen). As discussed herein, the device can include one or more communication components 1406, such as may include a cellular communications subsystem, Wi-Fi communications subsystem, BLUETOOTH® communication subsystem, and the like. FIG. 15 illustrates a set of basic components of a computing device 1500 such as the device 1400 described with respect to FIG. 14. In this example, the device includes at least one processor 1502 for executing instructions that can be stored in a memory device or element 1504. As would be apparent to one of ordinary skill in the art, the device can include many types of memory, data storage or computer-readable media, such as a first data storage for program instructions for execution by the at least one processor 1502, the same or separate storage can be used for images or data, a removable memory can be available for sharing information with other devices, and any number of communication approaches can be available for sharing with other devices. The device typically will include at least one type of display element 1506, such as a touch screen, electronic ink (e-ink), organic light emitting diode (OLED) or liquid crystal display (LCD), although devices such as portable media players might convey information via other means, such as through audio speakers. The device can include at least one communication component 1508, as may enabled wired and/or wireless communication of voice and/or data signals, for example, over a network such as the Internet, a cellular network, a Wi-Fi network, BLUETOOTH®, and the like. The device can include at least one additional input device 1510 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. For example, FIG. 16 illustrates an example of an environment 1600 for implementing aspects in accordance with various embodiments. As will be appreciated, although a Web-based environment is used for purposes of explanation, different environments may be used, as appropriate, to implement various embodiments. The system includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1606 for receiving requests and serving content in response thereto, although for other networks, an alternative device serving a similar purpose could be used, as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1606 in the form of HTML, XML, or another appropriate structured language in this example. The handling of all requests and responses, as well as the delivery of content between the client device 1602 and the application server 1608, can be handled by the Web server 1606. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing content (e.g., production data) 1612 and user information 1616, which can be used to serve content for the production side. The data store is also shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C#, C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for generating a customized grouping of visually similar items, comprising:
    receiving, from a computing device, a query image representing an item of interest;
    obtaining a plurality of visual attribute categories, each visual attribute category having a plurality of associated visual attributes representing visual aspects of an item;
    analyzing the query image to assign a visual attribute from each visual attribute category to the item of interest, the plurality of visual attribute categories including item type;
    obtaining a plurality of items in an item catalog, each of the plurality of items in the item catalog having an associated image and being assigned a visual attribute from each visual attribute category;
    obtaining user-generated visual similarity data for one or more items of the plurality of items in the item catalog, the user-generated visual similarity data based at least in part on the user input comprising a sequence of selection input corresponding to browsing items of the plurality of items in the item catalog;
    determining a visual similarity score for each of the plurality of items in the item catalog, the visual similarity score indicating a visual similarity of each of the plurality of items in the item catalog to the item of interest, the visual similarity score for each particular item of the plurality of items in the item catalog based at least in part on the user-generated visual similarity data and a ranking of the visual similarity of each particular item to the item of interest for each visual attribute assigned to the item of interest; and
    generating a visual similarity result set for each of the visual attributes, each visual similarity result set including items in the item catalog having a matching visual attribute, the visual similarity result set being ordered according to the visual similarity score.

2. The computer-implemented method of claim 1, further comprising:
    receiving an indication of a selection of at least one visual attribute; and
    generating for presentation on the computing device, in response to receiving the indication of the selection, a listing of items in the item catalog in the ordered visual similarity result set for the selected visual attribute, wherein the presentation is based at least on the visual similarity score.

3. The computer-implemented method of claim 2, further comprising:
    determining a product group associated with the item of interest;
    determining, for each item in the listing of items, a product group associated with the item in the listing of items; and
    prior to generating the presentation, removing items in the listing of items having an associated product group that does not match the product group associated with the item of interest.

4. The computer-implemented method of claim 1, wherein analyzing the query image comprises regression model-based collation or probability map generation.

5. A computer implemented method, comprising:
    determining an item of interest represented in an image;
    determining one or more visual attributes associated with the item of interest, the one or more visual attributes including item type;
    selecting a set of items from an item catalog, the set of items being selected based at least upon being visually similar to the item of interest, the set of items being ranked according to a visual similarity score assigned to each item of the set of items;
    determining one or more subsets of the set of items, each subset comprising items of the set of items having a visual attribute matching a visual attribute associated with the item of interest;
    ranking each item of each subset according to the respective visual similarity score of each item;
    generating for display on the computing device a listing of a first subset of items, the first subset being one of the one or more subsets of the set of items;
    receiving an indication of a selection of one of the items of the listing;
    determining a new visual similarity score for each of the non-selected items of the generated listing, the new visual similarity score based at least upon a determination of visual similarity to the selected item of the generated listing; and
    presenting for display on the computing device the non-selected items of the generated listing, wherein the display of the non-selected items of the generated listing are ordered according to a new secondary ranking based at least in part on the visual similarity score and the new visual similarity score.

6. The method of claim 5, further comprising:
presenting for display on a computing device one or more user interface elements, each of the user interface elements corresponding to one of the visual attributes;
receiving an indication of a selection of one of the user interface elements;
wherein the first subset of items corresponds to the visual attribute associated with the selected element.

7. The method of claim 6, further comprising:
determining which items of the generated listing are associated with a respective visual similarity score of at least a minimum value; and
modifying the generated listing to include only those items associated with a respective visual similarity score of at least the minimum value.

8. The method of claim 5, wherein determining the item of interest in the image comprises a segmentation process.

9. The method of claim 5, wherein the visual similarity score is based at least on image data associated with the item of interest, image data associated with each item of the item catalog, and metadata associated with each item of the item catalog.

10. The method of claim 9, wherein the metadata associated with each item of the item catalog is based at least in part on monitoring interactions of a plurality of users with respect to browsing items of the item catalog.

11. The method of claim 5, wherein the visual attributes associated with the item of interest comprise explicit attributes, and further comprising:
determining first implicit attributes associated with the image in which the item of interest is represented;
determining an implicit visual similarity score for each item of the set of items, the implicit visual similarity score being based at least in part on a comparison of the first implicit attributes and second implicit attributes for each image associated with each item of the set of items; and
re-ranking each item of each subset according to the respective visual similarity score of each item and the implicit visual similarity score for each item of the set of items.

12. The method of claim 11, wherein the first and second implicit attributes are selected from at least one of exposure level, focal length, a geographical location, individuals in the image, secondary items identified in the image, a manufacturer, or a watermark.

13. The method of claim 5, wherein the set of items are selected as being visually similar to the item of interest based at least in part on one of texture, color, apparel type, apparel cut, apparel material, occasion, style, apparel size, apparel hemline length, apparel sleeve length, apparel shape, or three-dimensional data.

14. The method of claim 5, further comprising:
receiving an image of the item of interest along with a search query,
wherein the set of items are further selected based on at least a portion of the search query.

15. A system, comprising:
at least one processor; and
memory storing instructions that, when executed by the at least one processor, cause the system to:
determine an item of interest represented in an image;
determine one or more visual attributes associated with the item of interest, the one or more visual attributes including item type;
select a set of items from an item catalog, the set of items being selected based at least upon being visually similar to the item of interest, the set of items being ranked according to a visual similarity score assigned to each item of the set of items;
determine one or more subsets of the set of items, each subset comprising items of the set of items having a visual attribute matching a visual attribute associated with the item of interest;
rank each item of each subset according to the respective visual similarity score of each item;
generate for display on the computing device a listing of a first subset of items, the first subset being one of the one or more subsets of the set of items;
receive an indication of a selection of one of the items of the listing;
determine a new visual similarity score for each of the non-selected items of the generated listing, the new visual similarity score based at least upon a determination of visual similarity to the selected item of the generated listing; and
present for display on the computing device the non-selected items of the generated listing, wherein the display of the non-selected items of the generated listing are ordered according to a new secondary ranking based at least in part on the visual similarity score and the new visual similarity score.

16. The system of claim 15, wherein the instructions further cause the system to:
present for display on a computing device one or more user interface elements, each of the user interface elements corresponding to one of the visual attributes; and
receive an indication of a selection of one of the user interface elements,
wherein the first subset of items corresponds to the visual attribute associated with the selected element.

17. The system of claim 16, wherein the instructions further cause the system to:
determine which items of the generated listing are associated with a respective visual similarity score of at least a minimum value; and
modify the generated listing to include only those items associated with a respective visual similarity score of at least the minimum value.

18. The system of claim 15, wherein the visual attributes associated with the item of interest comprise explicit attributes, and wherein the instructions further cause the system to:
determine first implicit attributes associated with the image in which the item of interest is represented;
determine an implicit visual similarity score for each item of the set of items, the implicit visual similarity score being based at least in part on a comparison of the first implicit attributes and second implicit attributes for each image associated with each item of the set of items; and
re-rank each item of each subset according to the respective visual similarity score of each item and the implicit visual similarity score for each item of the set of items.

19. The system of claim 18, wherein the first and second implicit attributes are selected from at least one of exposure level, focal length, a geographical location, individuals in the image, secondary items identified in the image, a manufacturer, or a watermark.

20. The system of claim 15, wherein the visual similarity score is based at least on image data associated with the item of interest, image data associated with each item of the item catalog, and metadata associated with each item of the item catalog.

* * * * *